US00RE50802E

(19) United States
(12) Reissued Patent
Chen

(10) Patent Number: US RE50,802 E
(45) Date of Reissued Patent: Feb. 17, 2026

(54) CONNECTOR ASSEMBLY

(71) Applicant: SPEED TECH CORP., Taoyuan (TW)

(72) Inventor: Chih-Cheng Chen, Taoyuan (TW)

(73) Assignee: SPEED TECH CORP., Taoyuan (TW)

(21) Appl. No.: 17/733,713

(22) Filed: Apr. 29, 2022

Related U.S. Patent Documents

Reissue of:
(64) Patent No.: 10,644,457
Issued: May 5, 2020
Appl. No.: 16/283,941
Filed: Feb. 25, 2019

(30) Foreign Application Priority Data

Feb. 26, 2018 (TW) ..... 107202586

(51) Int. Cl.

| | |
|---|---|
| ***H01R 13/6582*** | (2011.01) |
| ***H01R 12/71*** | (2011.01) |
| ***H01R 13/502*** | (2006.01) |
| ***H01R 13/514*** | (2006.01) |
| ***H01R 13/631*** | (2006.01) |
| ***H01R 13/6587*** | (2011.01) |
| ***H01R 13/6594*** | (2011.01) |
| ***H01R 24/60*** | (2011.01) |
| *H01R 107/00* | (2006.01) |

(52) U.S. Cl.
CPC ..... *H01R 13/6582* (2013.01); *H01R 12/712* (2013.01); *H01R 12/716* (2013.01); *H01R 13/502* (2013.01); *H01R 13/514* (2013.01); *H01R 13/631* (2013.01); *H01R 13/6587* (2013.01); *H01R 13/6594* (2013.01); *H01R 24/60* (2013.01); *H01R 2107/00* (2013.01)

(58) Field of Classification Search
CPC ..... H01R 13/6582; H01R 12/712; H01R 12/716; H01R 13/502; H01R 13/514; H01R 13/631; H01R 13/6587; H01R 13/6594; H01R 24/60; H01R 2107/00
See application file for complete search history.

(56) References Cited

U.S. PATENT DOCUMENTS

| | | | | |
|---|---|---|---|---|
| 4,822,303 A * | 4/1989 | Nakamura | ..... | H01R 13/658 439/554 |
| 5,611,711 A * | 3/1997 | Okada | ..... | H01R 12/727 439/607.08 |
| 7,226,314 B2 * | 6/2007 | Lang | ..... | H01R 13/6582 439/607.04 |

(Continued)

*Primary Examiner* — Karin Reichle
(74) *Attorney, Agent, or Firm* — Birch, Stewart, Kolasch & Birch, LLP

(57) ABSTRACT

A connector assembly includes a receptacle connector and a plug connector. The receptacle connector includes a shield having a receiving slot and a first insulation body disposed in the receiving slot. The first insulation body includes at least one mating cavity and at least one terminal group disposed in the mating cavity. The first insulation body and the shield collectively define at least one adapting structure. The at least one terminal group has a plurality of elastic terminals arranged as at least one row along a first direction. The plug connector includes a paddle board electrically connected to a cable and a second insulation body secured with the paddle board and the cable. At least one adapting element extends from the second insulation body and is adjacently disposed to the paddle board. The adapting element and the adapting structure are mated to each other.

8 Claims, 15 Drawing Sheets

(56) References Cited

U.S. PATENT DOCUMENTS 7,445,504 B1 11/2008 Zhang
7,467,977 B1 * 12/2008 Yi ..... H01R 12/7023 439/541.5
7,654,866 B2 * 2/2010 He ..... H01R 12/707 439/607.01
7,682,195 B2 * 3/2010 Yuan ..... H01R 13/648 439/95
7,762,840 B2 * 7/2010 Hamner ..... H01R 13/65802 439/541.5
7,976,342 B2 * 7/2011 Farole ..... H01R 13/6581 439/607.57
10,270,191 B1 * 4/2019 Li ..... H01R 12/771
10,454,194 B1 * 10/2019 Phillips ..... H05K 1/117
11,171,445 B1 * 11/2021 Shen ..... H01R 13/629
11,196,213 B2 * 12/2021 Shen ..... H01R 13/629
11,710,917 B2 * 7/2023 Hou ..... H01R 13/405 439/630
2008/0293301 A1 * 11/2008 Hamner ..... H01R 13/6594 439/607.01
2009/0264011 A1 * 10/2009 Wang ..... H01R 12/62 439/507
2009/0318026 A1 * 12/2009 Yi ..... H01R 13/6658 439/607.24
2010/0248544 A1 * 9/2010 Xu ..... H01R 13/6658 439/607.04
2011/0143594 A1 * 6/2011 Nagata ..... H01R 13/6593 439/607.54
2012/0045935 A1 * 2/2012 Zhang ..... H01R 12/724 439/607.08
2012/0214345 A1 * 8/2012 Wu ..... H01R 13/6583 439/607.19
2013/0203293 A1 * 8/2013 Zhu ..... H01R 13/512 439/620.22
2014/0199874 A1 * 7/2014 Tseng ..... H01R 13/641 439/345
2015/0056839 A1 * 2/2015 Zhang ..... H01R 12/724 439/350
2015/0171561 A1 * 6/2015 Little ..... H01R 24/60 439/607.34
2015/0207279 A1 * 7/2015 Little ..... H01R 24/60 439/607.01
2015/0318642 A1 * 11/2015 Lee ..... H01R 13/506 439/607.05
2016/0064868 A1 * 3/2016 Little ..... H01R 13/6581 439/607.01
2018/0115119 A1 * 4/2018 Little ..... H01R 4/2404
2018/0212376 A1 * 7/2018 Wang ..... H01R 13/502
2018/0254571 A1 * 9/2018 Herring ..... H01R 12/721
2019/0109393 A1 * 4/2019 Henry ..... H01R 12/721
2019/0296495 A1 * 9/2019 Zhou ..... H01R 13/6658
2020/0259294 A1 * 8/2020 Lu ..... H01R 12/57
2021/0075159 A1 * 3/2021 Wang ..... H01R 13/6582

* cited by examiner

CONNECTOR ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

[This] *This application is a broadening reissue application of U.S. application Ser. No. 16/283,941, issued as U.S. Pat. No. 10,644,457 B2 on May 5, 2020, which is incorporated by reference into the present application. That* application claims priority to Taiwan Application Serial Number 107202586, filed Feb. 26, 2018, the disclosure of which is incorporated herein by reference in its entirety.

BACKGROUND

Due to [the highly development of the informative technology] *technology developments*, *amounts of* various files and media stream data [increased largely] *apparently increase. As a result*, [the] *existing transmission methods fail to satisfy* high speed data transmission [has failed to satisfied with the old transmission method]. [The] *For high speed information access requirements, the* technology [for the requirement of high speed information access] of SAS (Serial Attached SCSI) standard can overcome the [obstacle of] *bottleneck encountered by* the conventional parallel technology, *so that the SAS can* provide even higher speed signal transmission ability*; moreover*, [and] *the SAS can* support and be compatible with the devices of SATA (Serial Advanced Technology Attachment). Therefore, *the* SAS [has the advantages of wide application] *can be adopted into various applications*.

[Recently, the structure design of the connector devices with different format can still be improved.] *Currently there is still room for improvement of the structural design of the connector devices with different specifications.* When *a connector device is* mating [or connecting to] *with* a [complemental] *mating* connector, the mated [standard] SAS connectors could be disconnected *from each other* easily [for unprecise] *due to imprecise* aligning, wrong direction mating, oblique mating, or low mating strength. In order to provide more efficient and durable mating or aligning [structure] *performances* for *the* connectors, a complete [schedule] *design consideration* for the plug connector and the receptacle connector is necessary to [satisfied] *satisfy* various aligning requirements [between] *for* the connectors. One [requirement desired] *of the requirements* is a compact and friendly design for the users or labors [implementing such] *upon conducting the* mating or aligning.

In the known technologies, U.S. Pat. No. 7,445,504 disclosed an electric connector A*, as shown in FIG. 12*. The electric connector A includes a metal shield B, an insulation body C*,* and a circuit board D. The metal shield B includes a top plate B1[,] *and* two side plates B2 respectively extend [form] *from* the two sides of the top plate B1 facing each other. Two restriction portions B3 [respectively] extend from the two side plates B2, respectively, along the same direction, and the restriction portions B3 collectively define a region. The pair of side plate B2 and the restriction portions B3 include a plurality of extension pins B4. The insulation body C and the metal shield B are respectively secured to the circuit board D. The insulation body C is disposed in the region defined by the restriction portions B3. The restriction portions B3 surround and are secured to the insulation body C. The metal shield B forms a space disposed in the front end of the insulation body C.

The metal shield B and the insulation body C are respectively disposed on a front *portion* and a back [of a linear direction on] *portion of* the circuit board D and [occupying space] *occupy spaces*. The [profile of the space occupied by the metal shield B of the connector, vertical] height [to the circuit board D,] *of the metal shield B with respect to the circuit board* is greater than [the profile of] the insulation body C. When *the electric connector A is* mating [a device with the electric connector A] *with a mating device*, the *mating* device is held and guided through the metal shield B*, and the insulation body C is devoid of structures for guiding and holding the mating device. As a result, the mating strength between the mating device and the electric connector A is not enough*. [Nothing on the insulation body C provides help for holding or guiding results occurring low mating strength between the electric connector A and inserted device easily.] Moreover, [there is no shielding to the insulation body C makes the noise and] *because the surface of the insulation body C is devoid of shielding members,* interference [be problematics for high band signal transmission] *issues may occur easily during high band signal transmission*.

Because [of the larger space of the circuit board occupied by the electric connector disclosed by the prior art] *the electric connector disclosed in the prior art occupies a larger space on the circuit board*, the spaces for other devices on the circuit board are limited. In order to reduce the space [utilization of] *on the circuit board occupied by* the electric connector [occupied on the circuit board] and *to* improve the mating strength [of] *between* the electric connector [with the complemental device] *and the mating device*, [it is highly required] *it would be helpful* to design an electric connector with a metal shield and [the] *a* insulation body integrated [that needs narrower] *with each other which occupies a smaller* space on the circuit board.

SUMMARY

One aspect of the present invention is to provide a receptacle connector with low profile, especially to an improved connector assembly including a plug and a receptacle connector. The receptacle connector includes a first insulation body and a shield. The shield covers the first insulation body to reduce the space utilization profile of the receptacle connector and increase the ability of electromagnetic shielding of the first insulation body.

Another aspect of the present invention is to provide a plug connector with simple fabrication, especially to a plug of an improved connector assembly. The plug connector includes a paddle board, a cable, and a second insulation body. The paddle board is electrically connected to the cable. The second insulation body is formed to cover the join portion of the paddle board and cable to protect and strengthen the join portion of the paddle board and cable to achieve the purposes of reduce assembling processes and cost.

Another aspect of the present invention is to provide a connector utilizing a better mating method, especially an improved connector assembly. The connector assembly includes a plug connector and a receptacle connector. The receptacle connector includes at least one adapting structure and the plug connector includes at least one adapting element. When the receptacle connector is mated with the plug connector, the adapting element is mated and assembled with the adapting structure to achieve the better effect for guiding and holding.

In order to achieve the aforesaid goals, the present invention provides an improved connector assembly. The connector assembly includes a receptacle connector and a plug connector. The receptacle connector includes a shield, a first insulation body and at least one terminal group. The shield is formed by metal plates and has a receiving slot. The first insulation body is made of insulation plastic material and is disposed in the receiving slot. The first insulation body includes at least one mating cavity. The first insulation body and the shield collectively defined at least one adapting structure. The terminal group has a plurality of elastic terminals arranged as at least one row along a first direction. The terminal group is disposed in the mating cavity of the first insulation body. The plug connector includes a paddle board and a second insulation body. The paddle board is electrically connected to a cable. The second insulation body is made of insulation plastic material and is secured with the paddle board and the cable. At least one adapting element extends from the second insulation body and is adjacently disposed to the paddle board. The adapting element and the adapting structure are mated with each other.

DETAILED DESCRIPTION

A proper embodiment of the present invention discloses a connector assembly, the connector assembly includes a receptacle connector 1 and a plug connector 2, and the receptacle connector 1 is mated with the plug connector 2.

The receptacle connector 1 includes two configurations. Referring to the first embodiment, the second embodiment, and the third embodiment in the FIG. 1a, FIG. 1b, and FIG. 1c. When the receptacle connector 1 is mated with the plug connector 2, the mating direction between the plug connector 2 and the receptacle connector 1 is parallel with the circuit board 6 of the receptacle connector 1, and the receptacle connector 1 is called right angle receptacle connector. Referring to the fourth embodiment, the fifth embodiment, and the sixth embodiment in the FIG. 2a, FIG. 2b, and FIG. 2c, when the receptacle connector 1 is mated with the plug connector 2, the mating direction between the plug connector 2 and the receptacle connector 1 is vertical with the circuit board 6 of the receptacle connector 1, and the receptacle connector 1 is called vertical receptacle.

Figure 1A:
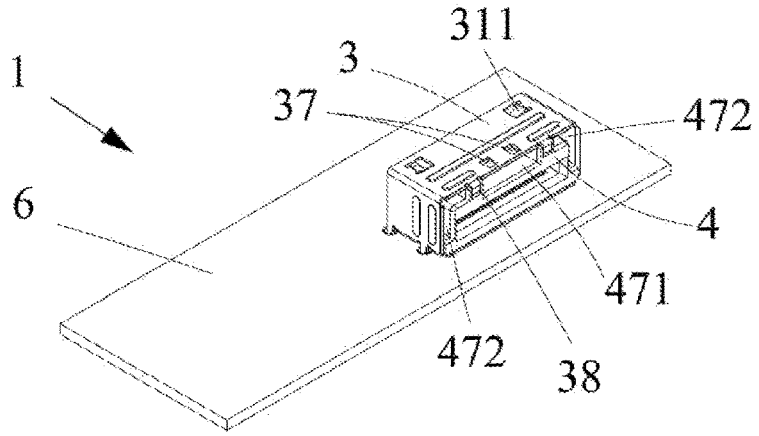
FIG. 1a is a perspective view of a receptacle connector according to the first embodiment of the present invention.
Figure 1B:
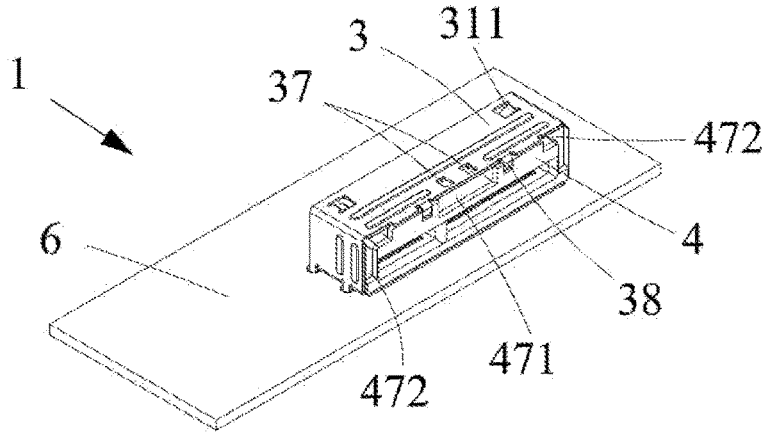
FIG. 1b is a perspective view of a receptacle connector according to the second embodiment of the present invention.
Figure 1C:
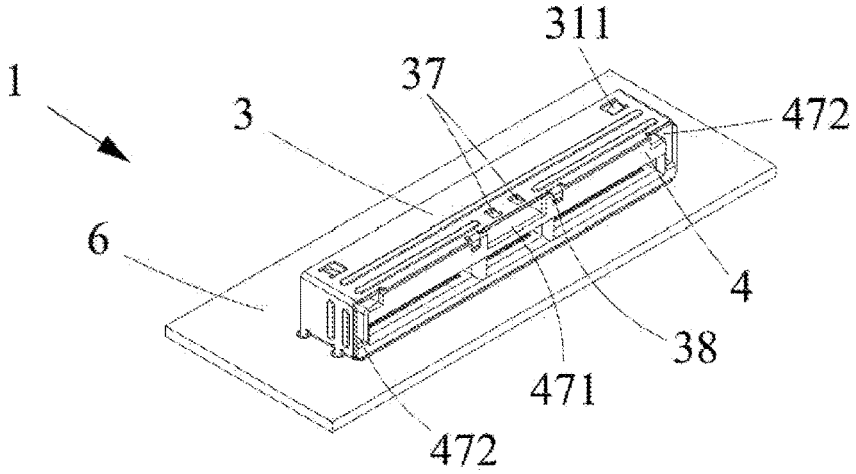
FIG. 1c is a perspective view of a receptacle connector according to the third embodiment of the present invention.
Figure 5A:
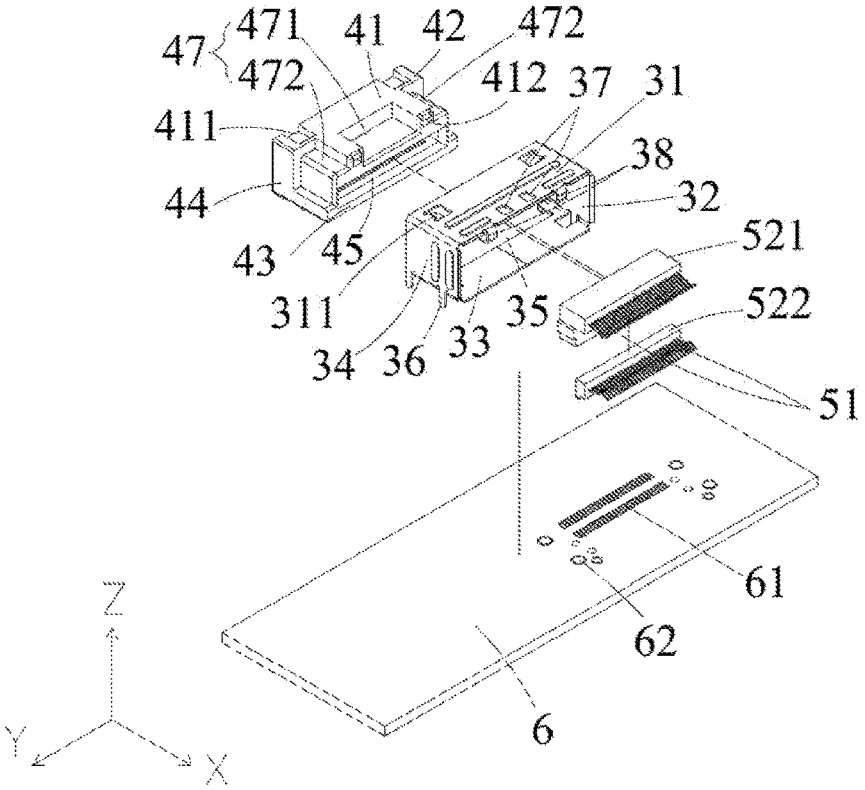
FIG. 5a is an exploded drawing of the receptacle connector of the first embodiment of the present invention.
Figure 5B:
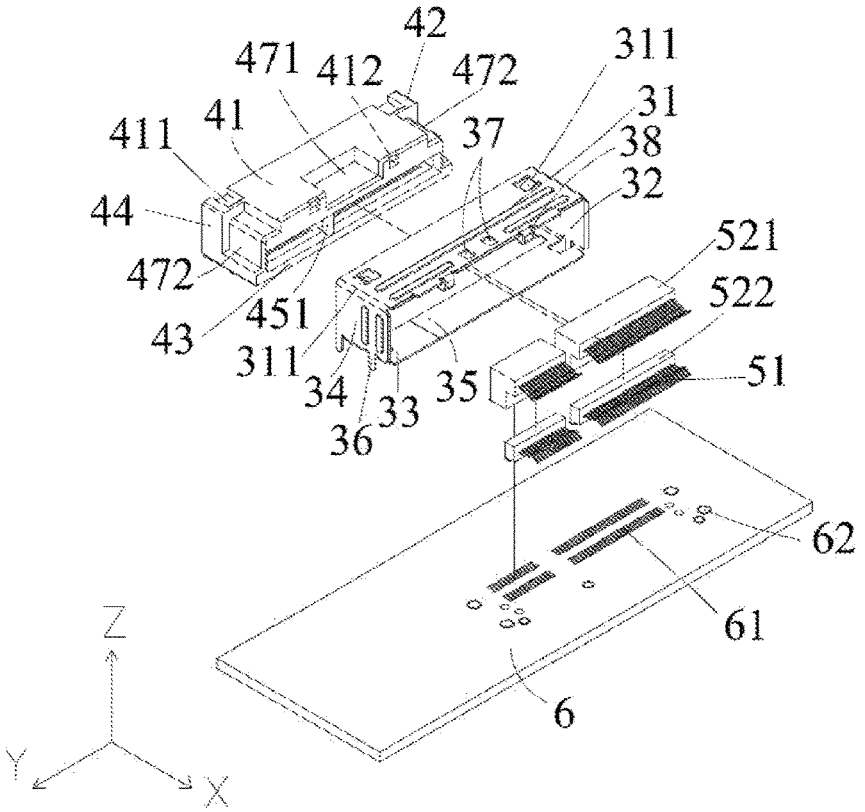
FIG. 5b is an exploded drawing of the receptacle connector of the second embodiment of the present invention.
Figure 5C:
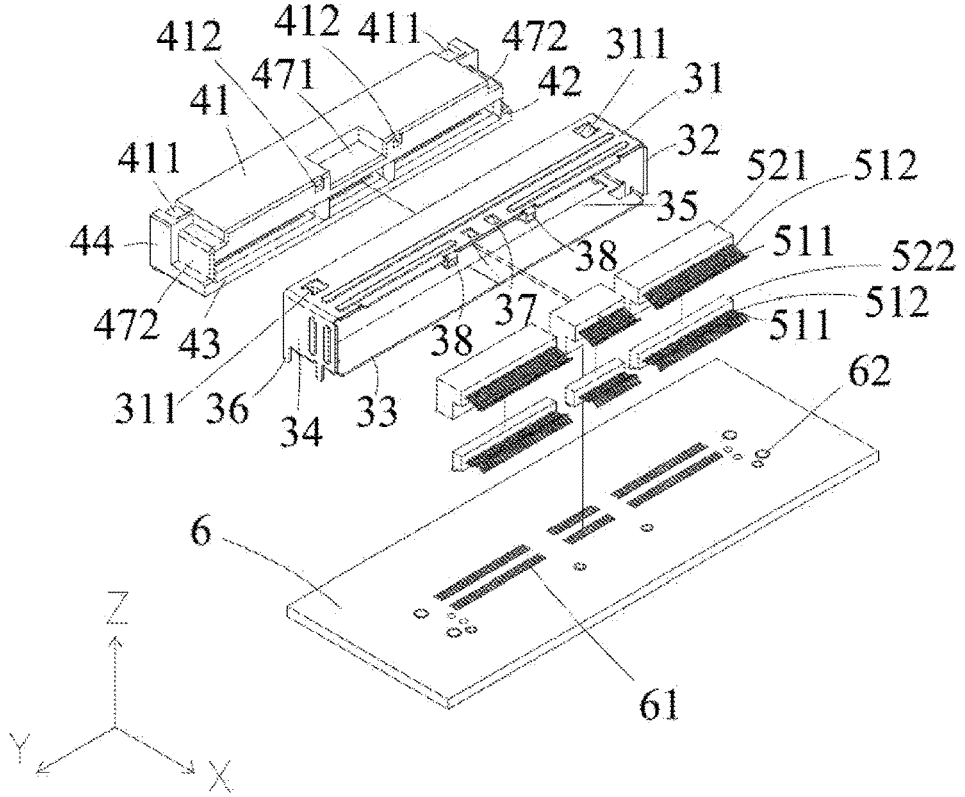
FIG. 5c is an exploded drawing of the receptacle connector of the third embodiment of the present invention.

Referring to the FIG. 5a, FIG. 5b, and FIG. 5c, which are the exploded drawings of FIG. 1a, FIG. 1b, and FIG. 1c, respectively. A Cartesian coordinate system is applied to indicate the direction of each components, a first direction X, a second direction Y orthogonal to the first direction X, and a third direction Z orthogonal to the first direction X and the second direction Y are defined as the three directions of the Cartesian coordinate. In the first embodiment, the second embodiment, and the third embodiment of the present invention, the receptacle connector 1 includes a shield 3, a first insulation body 4, at least one terminal group 5 and a circuit board 6.

The shield 3 is formed through the bending of the metal material and the shield 3 includes a plurality of outer sidewalls, a plurality of securing pins 36, and at least one [bard] *barb* 38. The outer sidewalls include a first outer sidewall 31, a second outer sidewall 32, a third outer sidewall 33, and a fourth outer sidewall 34, which form a receiving slot 35. The second outer sidewall 32 and the fourth outer sidewall 34 respectively extend from two sides of the first outer sidewall 31 along a same direction. Two sides of the third outer sidewall 33 *are* respectively [connect with] *connected to* the second outer sidewall 32 and the fourth outer sidewall 34. The third outer sidewall 33 and the first outer sidewall 31 are disposed oppositely and parallel along the third direction Z. The second outer sidewall 32 and each of the fourth outer sidewall 34 are disposed oppositely and parallel along the second direction Y. The securing pins 36 respectively extend from the edges of the outer sidewalls. At least one securing pin 36 extends from each of the second outer sidewall 32 and [each of] the fourth outer sidewall 34, and the securing pins 36 extend along the third direction Z. The [bard] *barb* 38 extends from a longer side of the first outer sidewall 31 and bends 180 [degree] *degrees* into the space in the receiving slot 35. A gap with a constant distance [is] *exists* between the [bard] *barb* 38 and the first outer sidewall 31. The first outer sidewall 31 includes a plurality of securing holes 37 and a plurality of stop blocks 311. The securing holes 37 are adjacently disposed close to an edge of the first outer sidewall [3 land] *31 and* penetrate the first outer sidewall 31. The stop blocks [331] *311* are pressing pieces or protruding structures formed by the surface stamping on the first outer sidewall 31 and are adjacently disposed to the second outer sidewall 32 and the fourth outer sidewall 34.

The first insulation body 4 is made of insulation plastic material and includes a first board 41, a second board 42, a third board 43, and a fourth board 44. The first board 41 and the third board 43 are disposed oppositely and parallel along the third direction Z. The second board 42 and the [forth] *fourth* board 44 are disposed oppositely and parallel along the second direction Y. The second board 42 and the fourth board 44 *are* respectively [connect with] *connected to* the opposite sides of the first board 41 and the third board 43. The boards form a mating cavity 45 and includes a plurality of partitions, a plurality *of* terminal slots 46, at least one positioning hole 412, and at least one adapting structure 47. The partitions and the terminal slots 46 are respectively disposed on two surfaces facing each other of the first board 41 and the third board 43. The partitions are arranged along the first direction X on the two surfaces facing each other of the first board 41 and the third board 43, and the space between two adjacent partitions [form] *forms* the terminal slots 46. The positioning holes 412 are respectively disposed on a surface of the first board 41 orthogonal to the first direction X and extend along the first direction X to the first board 41 to mate [mutually] with the [bard] *barbs* 38 of the shield 3. The adapting structure 47 includes a support adapting structure 471 and a pair of the main adapting [structure] *structures* 472. The support adapting structure 471 is disposed on the first board 41. The support adapting structure 471 is the recessed space formed by the outer surface of the first board 41 facing away from the mating cavity 45 along the third direction Z. The support adapting structure 471 [extend] *extends* along the first direction X toward the positioning holes 412 and is disposed adjacently to the positioning holes 412. Openings of the support adapting structure 471 are formed on the surfaces of the first board 41 orthogonal to the first direction X and the third direction Z. A portion of the first board 41 at the side *of the first board 41* away from the positioning holes 412 is [remained] *not removed*, such that *the support adapting structure 471 does not penetrate* the first board 41 [is not penetrated by the support adapting structure 471] in the first direction X. The projection of the plane of the support adapting structure 471 between the first direction X and the second direction Y is rectangular shaped. A pair of the stop [trench] *trenches* 411 [is] *are* disposed on another side of the first board 41 away from the positioning holes 412, and the stop trenches 411 are respectively adjacent to the second board 42 and the fourth board 44. The stop trenches 411 are recessed [form] *from* the first board 41 along the third direction Z which is orthogonal to the first board 41. Openings of the stop tranches 411 are formed on the surfaces of the first board 41 orthogonal to the first direction X and the third direction Z. The main adapting structures 472 are respectively disposed on the first board 41, the second board 42, and the fourth board 44. The main adapting structures 472 are respectively recessed from the surface of the first board 41 which is adjacent to the second board 42 and the fourth board 44 along the third direction Z, and then [recess] *recessed* from the two opposite surfaces of the second board 42 and the fourth board 44 along the second direction Y. The [structure] *structures* recessed from the surfaces of the second board 42 and the fourth board 44 are respectively connected to the [structure] *structures* recessed from the two sides of the first board 41, such that the main adapting [structure 471] *structures 472* extend from the second board 42 and the fourth board 44 to the first board 41 facing toward each other. The main adapting structures 472 are disposed adjacently to the stop trenches 411 and are prevented [form] *from* penetrating the shield 3 to disturb with the mating cavity 45. Openings of the main adapting [structure] *structures* 472 are formed on the surfaces of the first board 41 orthogonal to the first direction X and the third direction Z and on the surfaces of the second board 42 and the fourth board 44 orthogonal to the first direction X and the second direction Y. The main adapting structures 472 are away from the positioning holes 412 along the first direction X, and the first board 41, the second board 42, and the fourth board 44 are not penetrated by the main adapting structures 472. The projection of the plane of the main adapting structures 472 between the third direction Z and the second direction Y is L shaped. In the top view along the third direction Z of the first board 41, the support adapting structure 471 is disposed between the pair of the main adapting [structure] *structures* 472. Two securing [cylinder] *cylinders* respectively extend [form] *from* the second boards 42 and the fourth board 44 and *are* away from the first insulation body 4 along the third direction Z.

The first insulation body 4 is disposed in the receiving slot 35 of the shield 3, and the shield 3 covers the outer surfaces of the first insulation body 4. The first insulation body 4 and the shield 3 collectively define at least one adapting structure 47. The first outer sidewall 31 covers the outer surfaces of the first board 41. The first sidewall 31 covers the support adapting structure 471 and a portion of the openings of the main adapting [structure] *structures* 472 which are orthogonal to the third direction Z. The securing holes 37 of the first outer sidewall 31 are disposed opposite to the support adapting structure 471. The [bard] *barbs* 38 [is] *are* respectively secured to the positioning [hole] *holes* 412 of the first board 41, and the stop blocks 331 of the shield [31] 3 are respectively engaged to the stop trenches 411. The second outer sidewall 32 and the fourth outer sidewall 34 respectively cover the outer surfaces of the second board 42 and the fourth board 44, and *the second outer sidewall 32 and the fourth outer sidewall 34* cover a portion of the openings of the main adapting [structure] *structures* 472 which are orthogonal to the second direction Y. The third outer sidewall 33 covers the third board 43, *and* the supporting adapting structure 471 and the main adapting structures 472 are respectively formed between the shield 3 and the first insulation body 4. The shield 3 further [limit] *limits* the space configuration of the support adapting structure 471 and the main adapting structures 472, and only [keep the] *keeps enclosed* openings on the surface of the first insulation body 4 orthogonal to the first direction X free. The shield 3 is secured with the stop trenches 411 and the positioning holes 412 through the stop blocks 311 and the [bard] *barbs* 38 to strengthen the connection between the shield 3 and the first insulation body 4, and the shield 3 covers the outer surfaces of the first insulation body 4 to provide better electromagnetic shielding effect and protection ability.

The terminal group 5 includes a plurality of elastic terminals 51 and at least one base 52. Each of the elastic terminals 51 includes a touch portion 511, a soldering portion 513, and an extension portion 512 [connecting] *connected* to the touch portion 511 and the soldering portion 513. The elastic terminals 51 are arranged as at least one row along the second direction Y. In the present embodiment, the elastic terminals 51 are arranged respectively as two rows, and the touch portions 511 of each row of the elastic terminals 51 has bending portions [extend] *extending* toward each other, respectively. The base 52 is made of insulation plastic material[,] and is secured at each of the extension portions 512 of the elastic terminals 51 by over molding. Each of the extension portions 512 of the elastic terminals 51 has a bending angle which is larger or equal to 90 [degree] *degrees*. The extension direction of the soldering portions 513 is different from the extension direction of the extension portions 512. The extension portions 512 of one row of the elastic terminals 51 with longer lengths are covered by the first base 521, and the extension portions 512 of the other row of the elastic terminals 51 with shorter lengths are covered by the second base 522. The first base 512 and the second 522 are assembled to form the complete terminal group 5. The soldering portions 513 respectively extend out of the base 52. The terminal group 5 is disposed in the mating cavity 45 formed by the first insulation body 4 along the row direction. The adapting structure 47 is disposed outside the terminal group 5. The elastic terminals 51 are respectively disposed in the terminal slots 46 of the first board 41 and the third board 43. The base 52 is secured in the first insulation body 4. The bending portion of each of the touch portions 511 [protrude] *protrudes* out of the partitions and extend toward each other to provide better electric connection for the plug connector 2.

The circuit board 6 includes a plurality of soldering points 61 and a plurality of mating holes 62, *and* the soldering portions 61 are arranged as two symmetry rows and are mated with the soldering portions 513 of the elastic terminals 51. The first insulation body 4 and the terminal group 5 are secured in the receiving [slots] *slot* 35 of the shield 3 after assembling. The first insulation body 4, the terminal group 5, and the shield 3 are secured on the circuit board 6. The securing pins 36 of the shield 3 and the securing cylinders of the first insulation body 4 are respectively secured in the mating holes 62 of the circuit board 6. The shield 3 is [set earthed with] *grounded to* the circuit board 5 through the securing pins 36. The soldering portions 513 of the terminal group 5 are respectively secured in the soldering points 61 of the circuit board 6 and electrically connected to each other. The soldering portions 513 are secured through surface mount technology (SMT), but it is not limited in other embodiments. The dual in-line package can also be used for securing. Deposition of the securing cylinders and the securing pins 36 can strengthen the securing strength between the terminal group 5 and the circuit board 6 and prevent the detachment problem of the elastic terminals 51.

Referring to FIG. 5a, the receptacle connector 1 disclosed in the first embodiment is a right angle receptacle connector. The elastic terminals 51 totally include fifty-six pins. The elastic terminals 51 are respectively arranged as two rows, such that the fifty-six pins are formed by twenty-eight pairs of the elastic terminals 51.

Referring to FIG. 5b, the receptacle connector 1 disclosed in the second embodiment is a [right angle] *right-angle* receptacle connector. The difference between the first embodiment and the second embodiment is the number of the terminals 51. The elastic terminals 51 of the second embodiment totally include eighty-four pins, and the elastic terminals 51 are arranged as two rows. Two terminal groups 5 are respectively formed by twenty-eight pairs of *the* elastic terminals 51 and fourteenth pairs of *the* elastic terminals 51. The first insulation body 4 includes a dividing element 451. Two mating cavities 45 are formed by respectively connecting [to] the dividing element 451 with the first board 41 and the third board 43. The mating cavities 45 are divided by the dividing element 451 as two disconnected spaces. The two terminal groups 5 are respectively disposed at two different spaces of the mating cavities 45 of the first insulation body 4, and the two terminal groups 5 are divided by dividing element 451.

Referring to FIG. 5c, the receptacle connector 1 disclosed in the third embodiment is a [right angle] *right-angle* receptacle connector. The difference between the third embodiment and the first embodiment is the number of the terminals. The elastic terminals 51 of the third embodiment totally include one hundred and forty pins, and the elastic terminals 51 are arranged as two rows. Three terminal groups 5 are respectively formed by two groups of twenty-eight pairs of *the* elastic terminals 51 and one group of fourteenth pairs of *the* elastic terminals 51. The first insulation body 4 includes two dividing elements 451. Three mating cavities 45 are formed by respectively connecting to the dividing elements 451 with the first board 41 and the third board 43. The mating cavities 45 are divided by the dividing elements 451 as three disconnected spaces. The three terminal groups 5 are respectively disposed at three different spaces in the mating cavities 45 of the first insulation body 4. The [arrangement order of the] terminal groups 5 in the mating cavities 45 [is that] *are arranged as:* a [group of] terminal group 5 with fourteen pairs of *the* elastic terminals 51 *is* disposed between two [groups of the] terminal groups 5 with twenty-eight pairs of *the* elastic terminals 51, *and the three* [. Three] terminal groups 5 are divided by dividing elements 451.

Figure 2A:
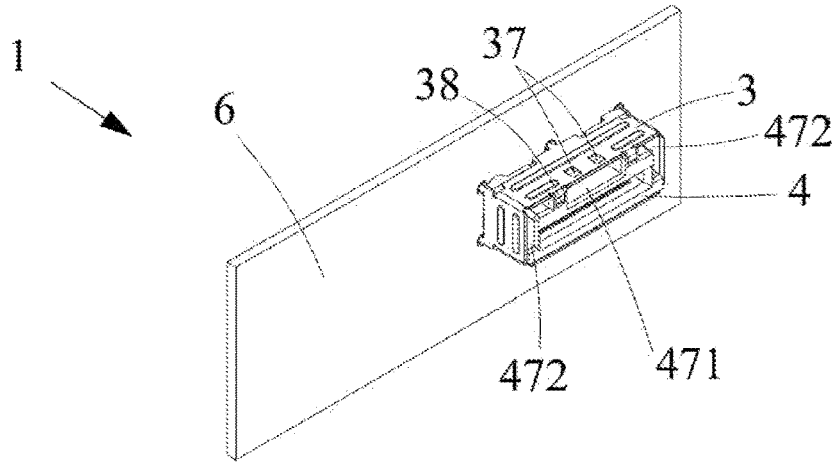
FIG. 2a is a perspective view of a receptacle connector according to the fourth embodiment of the present invention.
Figure 2B:
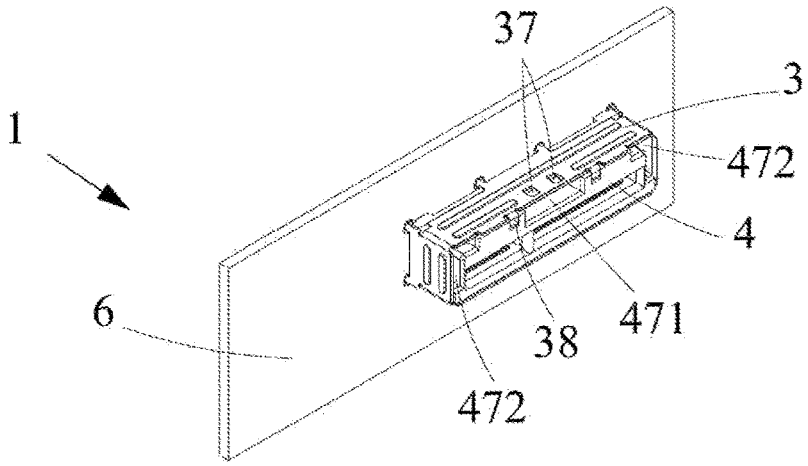
FIG. 2b is a perspective view of a receptacle connector according to the fifth embodiment of the present invention.
Figure 2C:
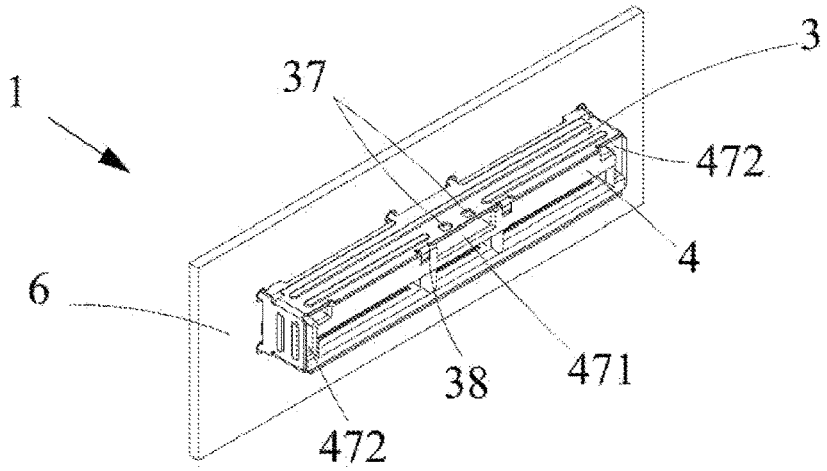
FIG. 2c is a perspective view of a receptacle connector according to the sixth embodiment of the present invention.
Figure 6A:
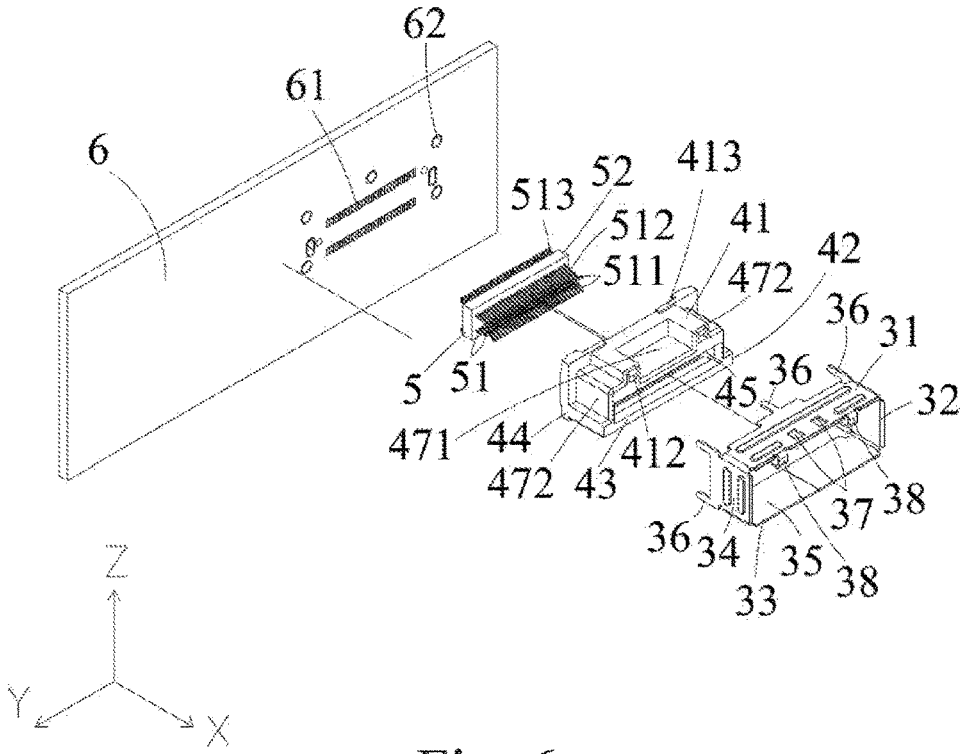
FIG. 6a is an exploded drawing of the receptacle connector of the fourth embodiment of the present invention.
Figure 6B:
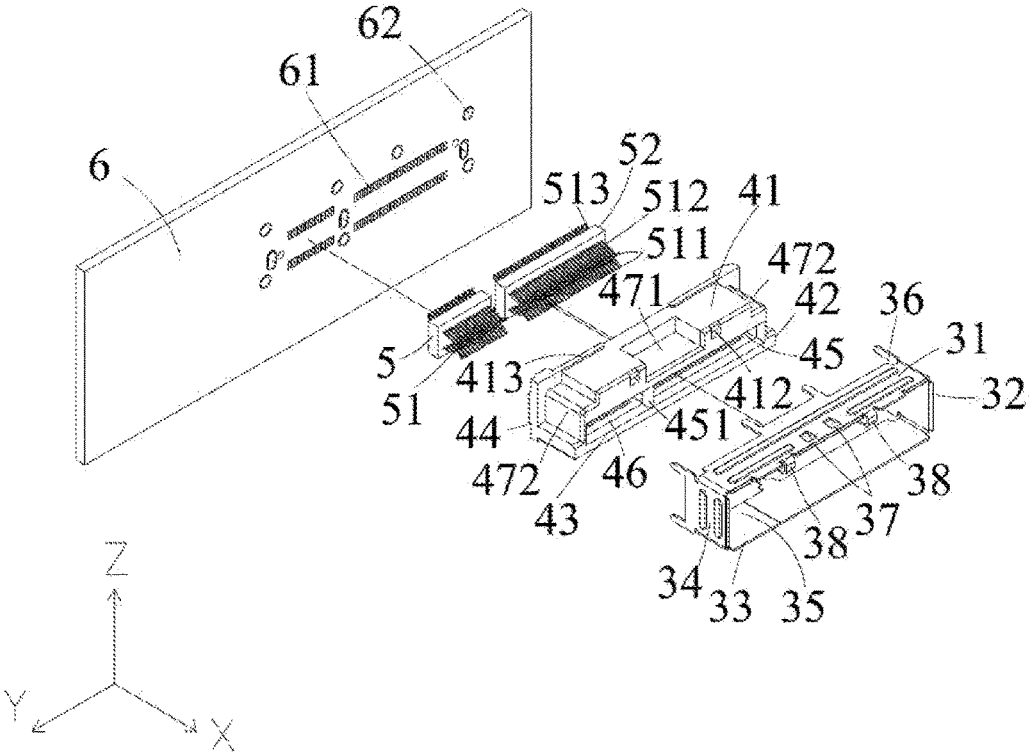
FIG. 6b is an exploded drawing of the receptacle connector of the fifth embodiment of the present invention.
Figure 6C:
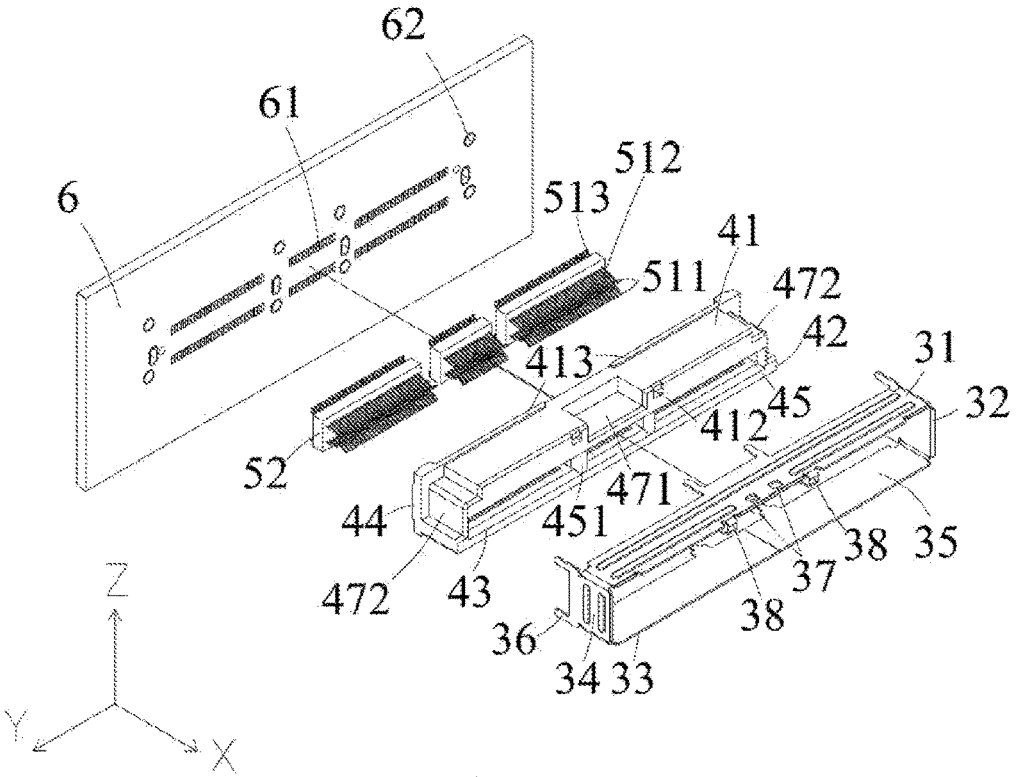
FIG. 6c is an exploded drawing of the receptacle connector of the sixth embodiment of the present invention.

[Referring to] FIG. 6a, FIG. 6b, and FIG. 6c[, which] are the exploded drawings of the FIG. 2a, FIG. 2b, and FIG. 2c, respectively. A Cartesian coordinate system is applied to indicate the directions of each [components] *component*, a first direction X, a second direction Y orthogonal to the first direction X, and a third direction Z orthogonal to the first direction X and the second direction Y are defined as the three directions of the Cartesian coordinate. In the fourth embodiment, the fifth embodiment, and the sixth embodiment of the present invention, the receptacle connector 1 includes a shield 3, a first insulation body 4, at least one terminal group 5, and a circuit board 6.

The shield 3 is formed through the bending of the metal material and the shield 3 includes a plurality of outer sidewalls, a plurality of securing pins 36, and at least one [bard] *barb* 38. The outer sidewalls include a first outer sidewall 31, a second outer sidewall 32, a third outer sidewall 33, and a fourth outer sidewall 34, which form a receiving slot 35. The second outer sidewall 32 and the fourth outer sidewall 34 respectively extend from two sides of the first outer sidewall 31 along a same direction. The third outer sidewall 33 [respectively connects with] *is connected to* the second outer sidewall 32 and the fourth outer sidewall 34 at two sides, *respectively*. The third outer sidewall 33 and the first outer sidewall 31 are disposed oppositely and parallel along the third direction Z. The second outer sidewall 32 and the fourth sidewall 34 are disposed oppositely and parallel along the second direction Y. The securing pins 36 respectively extend from the edges of the outer sidewalls, and at least one *of the* securing [pin] *pins* 36 extends from the first outer sidewall 31, the second outer sidewall 32, the third outer sidewall 33, and the fourth outer sidewall 34. The securing pins 36 extend along the first direction X facing away from the outer sidewalls. The [bard] *barb* 38 extends from a longer side of the first outer sidewall 31 and bends 180 [degree] *degrees* into the space in the receiving slot 35. A gap with constant distance is between the [bard] *barb* 38 and the first outer sidewall 31. The first outer sidewall 31 includes a plurality of securing holes 37. The securing holes 37 are disposed adjacently close to an edge of the first outer sidewall 31 and penetrate the first outer sidewall 31.

The first insulation body 4 is made of insulation plastic material and includes a first board 41, a second board 42, a third board 43 and a fourth board 44. The first board 41 and the third board 43 are disposed oppositely parallel along the third direction Z. The second board 42 and the fourth board 44 are disposed oppositely parallel along the second direction Y. The second board 42 and the fourth board 44 *are* respectively [connect with] *connected to* the opposite sides of the first board 41 and the third board 43. The boards form a mating cavity 45. The boards [includes] *include* a plurality of partitions, a plurality *of* terminal slots 46, at least one positioning hole 412, and at least one adapting structure 47. The partitions and the terminal slots 46 are disposed on two surfaces facing each other of the first board 41 and the third board 43. The partitions extend along the first direction X on the two surfaces facing each other of the first board 41 and the third board 43, and the partitions are arranged in parallel with each other. The space between two adjacent partitions [form] *forms* the terminal slots 46. The positioning holes 412 are respectively disposed on a surface of the first board 41 orthogonal to the first direction X. The positioning holes 412 extend along the first direction X to the first board 41 and are configured to [mate] *be mated* with the [bard] *barbs* 38 of the shield 3. The adapting structure 47 includes a support adapting structure 471 and a pair of the main adapting [structure] *structures* 472. The support adapting structure 471 is disposed on the first board 41. The support adapting structure 471 is the recessed space formed by the outer surface of the first board 41 facing away from the mating cavity 45 along the third direction Z. The support adapting structure 471 extends along the first direction X toward the positioning holes 412 and is disposed adjacently to the positioning holes 412. Openings of the support adapting structure 471 are formed on the surfaces of the first board 41 orthogonal to the first direction X and the third direction Z. A portion of the first board 41 at the side *of the first board 41* away from the positioning holes 412 is [remained] *not removed*, such that *the support adapting structure 471 does not penetrate* the first board 41 [is not penetrated by the support adapting structure 471] in the first direction X. The projection of the plane of the support adapting structure 471 between the first direction X and the second direction Y is rectangular shaped. The main adapting structures 472 are respectively disposed on the first board 41, the second board 42, and the fourth board 44. The main adapting structures 472 are respectively recessed from the surface of the first board 41 which is adjacent to the second board 42 and the fourth board 44 along the third direction Z, and then are recessed from the two opposite surfaces of the second board 42 and the fourth board 44 along the second direction Y. The [structure] *structures* recessed from the surfaces of the second board 42 and the fourth board 44 are respectively connected to the [structure] *structures* recessed from the two sides of the first board 41, such that the main adapting [structure] *structures* 472 extend from the second board 42 and the fourth board 44 to the first board 41 facing toward each other. The main adapting [structure] *structures* 472 [was] *are* divided by the first board 41, the second board 42, and the fourth board 44 to prevent the disturbance with the mating cavity 45. Openings of the main adapting [structure] *structures* 472 are formed on the surfaces of the first board 41 orthogonal to the first direction X and the third direction Z and are formed on the surfaces of the second board 42 and the fourth board 44 orthogonal to the first direction X and the second direction Y. Ends of the first board 41, the second board 42, and the fourth board 44 away from the positioning holes 412 along the first direction X are not penetrated by the main adapting [structure] *structures* 472. The projection of the plane of the main adapting structures 472 between the third direction Z and the second direction Y is L shaped. In the top view along the third direction Z of the first board 41, the support adapting structure 471 is disposed between the pair of the main adapting [structure] *structures* 472. At least one stopper 413 [protrude] *protrudes* [form] *from* the first board 41 and the third board 43. The stoppers 413 are disposed on the parallel sides away from the positioning holes 412. Two securing [cylinder] *cylinders* respectively extend [form] *from* the second boards 42 and the fourth board 44 and away from the first insulation body 4 along the third direction Z.

The first insulation body 4 is disposed in the receiving slot 35 of the shield 3, and the shield 3 covers the outer surfaces of the first insulation body 4. The first insulation body 4 and the shield 3 collectively define at least one adapting structure 47. The first outer sidewall 31 covers the outer surfaces of the first board 41. The first sidewall 31 covers the support adapting structure 471 and a portion of the openings of the main adapting structure 472 which are orthogonal to the third direction Z. The securing holes 37 are disposed opposite to the support adapting structure 471. The [bard] barb 38 is secured to the positioning hole 412 of the first board 41. The second outer sidewall 32 and the fourth outer sidewall 34 respectively cover the outer surfaces of the second board 42 and the fourth board 44, and cover a portion of the openings of the main adapting structure 472 which are orthogonal to the second direction Y. The third outer sidewall 33 covers the third board 43, and the *pair of the* main adapting structures 472 are [disposed] between the shield 3 and the first insulation body 4. The shield 3 further [limit] *limits* the space configuration of the support adapting structure 471 and the main adapting structures 472, and only [keep] *keeps* the openings on the surface of the first insulation body 4 orthogonal to the first rection X free. The stop blocks 413 are respectively [touched with] *contacted by* the first outer sidewall 31 and the third outer sidewall 33 of the shield 3 to avoid sliding of the shield 3. The connection strength between the shield 3 and the first insulation body 4 [was] *is* strengthened through the [bard] *barbs* 38 of the shield 3 and the positioning holes 412 and the stop blocks 413 of the first insulation body 4. The [hosing] *shield* 3 covers the outer surfaces of the first insulation body 4 to provide better electromagnetic shielding effect and protection ability.

The terminal group 5 includes a plurality of elastic terminals 51 and at least one base 52. Each of the elastic terminals 51 includes a touch portion 511, a soldering portion 513 and an extension portion 512 connecting to the touch portion 511 and the soldering portion 513. The elastic terminals 51 are arranged as at least one row along the second direction Y. In the present embodiment, the elastic terminals 51 are arranged respectively as two rows. The touch portions 511 of each row of the elastic terminals 51 has bending portions extend toward each other, respectively. The base 52 is made of insulation plastic material. The base 52 is secured at each of the extension portions 512 of the elastic terminals 51 by over molding. The soldering portions 513 respectively extend out of the base 52. The terminal group 5 is disposed in the mating cavity 45 formed by the first insulation body 4 along the row direction. The adapting structure 47 is disposed outside the terminal group 5. The elastic terminals 51 are respectively disposed in the terminal slots 46 of the first board 41 and the third board 43. The base 52 is secured in the first insulation body 4. The bending portion of each of the touch portions 511 protrude out of the partitions and extend toward each other to provide better electric connection for the plug connector 2.

The circuit board 6 includes a plurality of soldering points 61 and a plurality of mating holes 62, *and* the soldering portions 61 are arranged as two symmetry rows and mate with the soldering portions 513 of the elastic terminals 51. The first insulation body 4 and the terminal group 5 are further secured in the receiving [slots] *slot* 35 of the shield 3 after assembling. The first insulation body 4, the terminal group 5, and the shield 3 are secured on the circuit board 6. The securing pins 36 of the shield 3 and the securing cylinders of the first insulation body 4 are respectively secured in the mating holes 62 of the circuit board 6. The shield 3 is [set earthed with] *grounded to* the circuit board 6 through the securing pins 36. The soldering portions 513 of the terminal group 5 are respectively secured in the soldering points 61 of the circuit board 6 and electrically connected to each other. The soldering portions 513 are secured through surface mount technology, but it is not limited in other embodiments. The dual in-line package can also be used for securing. Deposition of the securing cylinders and the securing pins 36 can strengthen the securing between the terminal group 5 and the circuit board 6 and prevent the detachment problem of the elastic terminals 51.

Referring to FIG. 6a, the receptacle connector 1 disclosed in the fourth embodiment is a vertical receptacle connector. The elastic terminals 51 totally include fifty-six pins. The elastic terminals 51 are respectively arranged as two rows to form twenty-eight pairs of the elastic terminals 51.

Referring to FIG. 6b, the receptacle connector 1 disclosed in the fifth embodiment is a vertical receptacle connector. The difference between the fourth embodiment and the fifth embodiment is the number of the terminals 51. The elastic terminals 51 of the fifth embodiment totally include eighty-four pins, and the elastic terminals 51 are arranged as two rows to form twenty-eight pairs of *the* elastic terminals 51 and fourteenth pairs of *the* elastic terminals 51. The first insulation body 4 includes a dividing element 451. Two mating cavities 45 are formed by respectively connecting the dividing element 451 to the first board 41 and the third board 43. The mating cavities 45 are divided by the dividing element 451 as two disconnected spaces. The two terminal groups 5 are respectively disposed at two different spaces of the mating cavities 45 of the first insulation body 4, and the two terminal groups 5 are separated by *the* dividing element 451.

Referring to FIG. 6c, the receptacle connector 1 disclosed in the sixth embodiment is a vertical receptacle connector. The difference between the sixth embodiment and the fourth embodiment is the number of the terminals 51. The elastic terminals of the sixth embodiment totally include one hundred and forty pins, and the elastic terminals 51 are arranged as two rows. Three terminal groups 5 are respectively formed by two groups of twenty-eight pairs of *the* elastic terminals 51 and one group of fourteenth pairs of *the* elastic terminals 51. The first insulation body 4 includes two dividing elements 451. Three mating cavities 45 are formed by respectively connecting the dividing elements 451 to the first board 41 and the third board 43. The mating cavities 45 are divided by the dividing elements 451 to three disconnected spaces. The three terminal groups 5 are respectively disposed at three different spaces in the mating cavities 45 of the first insulation body 4. The [arrangement order of the] terminal groups 5 in the mating cavities 45 [is that] *are arranged* as: a [group of] terminal group 5 with fourteen pairs of elastic terminals 51 *is* disposed between two [groups of the] terminal groups 5 with twenty-eight pairs of *the* elastic terminals 51, *and the three* [. Three] terminal groups 5 are separated by *the* dividing elements 451.

Figure 3A:
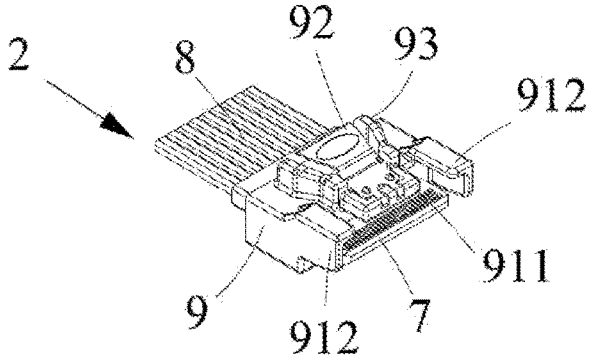
FIG. 3a is a perspective view of a plug connector according to the seventh embodiment of the present invention.
Figure 3B:
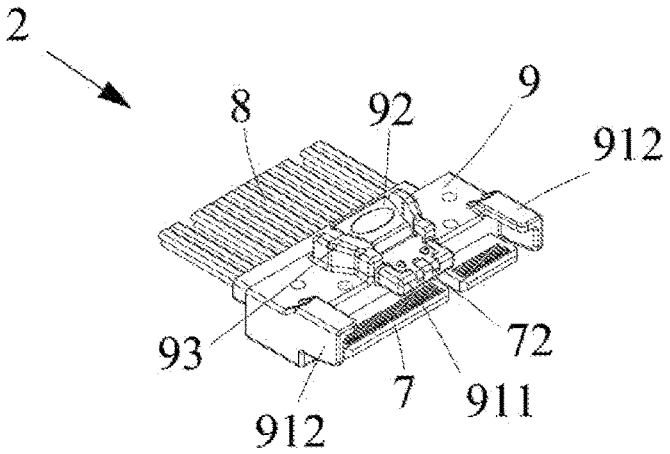
FIG. 3b is a perspective view of a plug connector according to the eighth embodiment of the present invention.
Figure 3C:
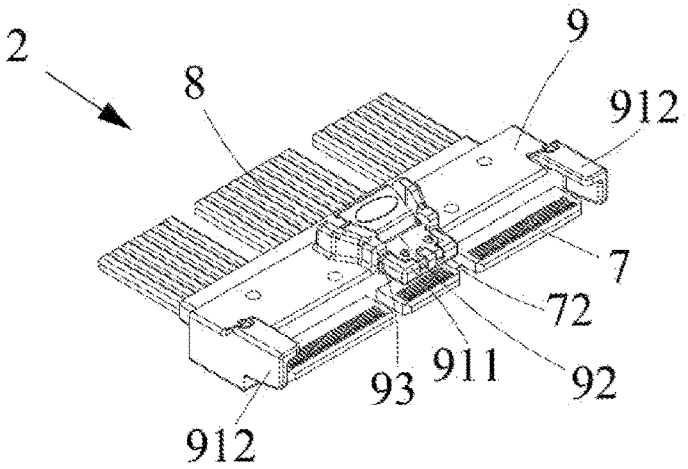
FIG. 3c is a perspective view of a plug connector according to the ninth embodiment of the present invention.
Figure 4A:
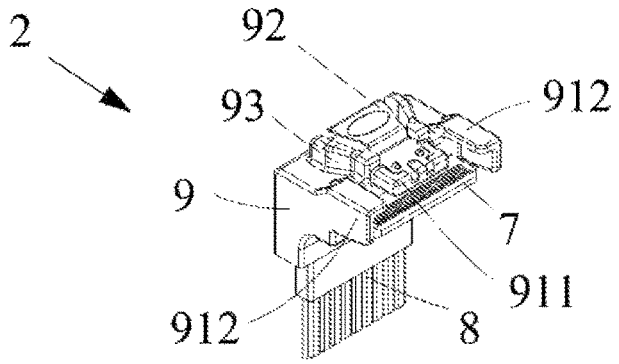
FIG. 4a is a perspective view of a plug connector according to tenth fourth embodiment of the present invention.
Figure 4B:
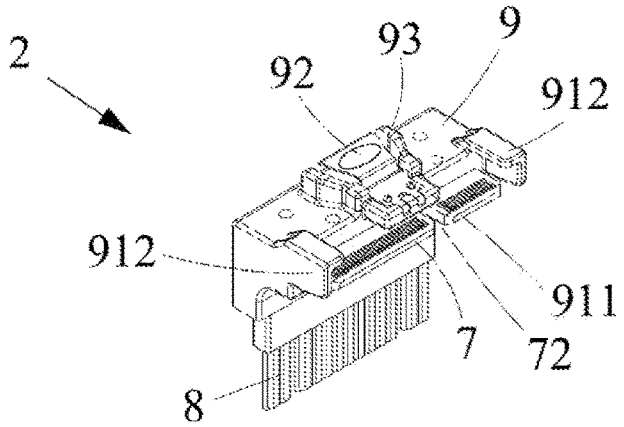
FIG. 4b is a perspective view of a plug connector according to the eleventh embodiment of the present invention.
Figure 4C:
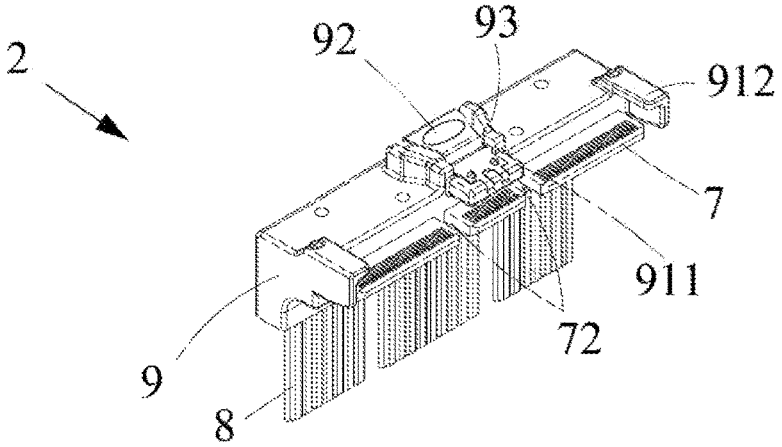
FIG. 4c is a perspective view of a plug connector according to the twelfth embodiment of the present invention.

To adjust to different environment, the plug connectors are designed with different configurations. Referring to FIG. 3a, FIG. 3b, and FIG. 3c, when the extension direction of the paddle board 7 of the plug connector 2 is linear with the extension direction of the cable 8, the plug connector 2 is called straight plug. Referring to FIG. 4a, FIG. 4b, and FIG. 4c, when the extension direction of the paddle board 7 of the plug connector 2 is vertical to the extension direction of the cable 8, the plug connector 2 is called right angle plug. The difference between the aforesaid two different configurations is that the cable 8 extends from different surfaces of the second insulation body 9 to adapt to different design deviation in space application.

Referring to the FIG. 7a, FIG. 7b, FIG. 7c, FIG. 8a, FIG. 8b, and FIG. 8c, which are the exploded drawings of FIG. 3a, FIG. 3b, FIG. 3c, FIG. 4a, FIG. 4b and FIG. 4c, respectively. A Cartesian coordinate system is applied to indicate the directions of each [components] *component*, a first direction X, a second direction Y orthogonal to the first direction X, and a third direction Z orthogonal to the first direction X and the second direction Y are defined as the three directions of the Cartesian coordinate. In the embodiments of the present invention, the plug connector 2 includes a paddle board 7, a cable 8, an elastic element 92, and a second insulation body 9.

The paddle board 7 includes a plurality of contact points 71 on the opposite surfaces along the third direction Z, and the contact points 71 are arranged along the second direction Y. The cable 8 includes a plurality of wires arranged as two rows. The arrangement of the wires [form] *from* the same row is that two ground wires are respectively disposed at each [sides] *side* of a pair of signal [wire] *wires* to form a G-S-S-G arrangement form. The ground wires disposed at two sides of each of the signal wires can provide better shielding effect and reduce the electromagnetic disturbance between each pair of the signal wires. Two rows of wires are respectively disposed at two sides of the paddle board 7 to mate with the contact points 71. The wires are respectively soldered at one side of the paddle board 7 to *be* electrically [connect] *connected to* the cable 8 and the paddle board 7 by electrically connecting [to] the circuit in the paddle board 7 with the contact points 71 at another side of the paddle board 7.

The second insulation body 9 is made of insulation plastic material and respectively secured *to* the paddle board 7 and the cable 8. The connection part between the paddle board 7 and the cable 8 [are] *is* encapsulated in the second insulation body 9 by over molding. The second insulation body 9 can strengthen and protect the connection part between the paddle board 7 and the cable 8. The paddle board 7 and the cable 8 respectively extend at two different surfaces of the second insulation body 9. At least one adapting element 91 [extend] *extends* from the second insulation body 9 along the first direction X, and the adapting element 91 and the paddle board 7 extend from the same surface of the second insulation body 9 along the same direction. The adapting element 91 includes a support adapting element 911 and a pair of main adapting [element] *elements* 912. The support adapting element 911 and the pair of *the* main adapting [element] *elements* 912 respectively extend from the surface of the second insulation body 9, *and* the support adapting element 911 and the paddle board 7 [are adjacently disposed and are in parallel] *arranged in parallel and adjacent* to each other. The support adapting element 911 includes a protruding structure 93 extending [form] *from* an end of the support adapting element 91. The protruding structure 93 protrudes along the third direction Z and surrounds the edge of the support adapting element 911[. The], *and the* protruding structure 93 extends *to the surface of the second insulation body 9 along the edge of the support adapting element 911* [to the surfaces of the second insulation body 9]. A receiving space 931 is formed by the region on the surface of the second insulation body 9 and the support adapting element [92] *911 is* surrounded by the protruding structure 93. The receiving space 931 has a plurality of positioning elements. The main adapting [element] *elements* 912 [is] *are* disposed [between] *adjacent to* the opposite two sides of the paddle board 7. The support adapting element 911 is disposed between the pair of the main adapting [element] *elements* 912. The main adapting elements 912 extend from a surface of the second insulation body 9 along the first direction X. The main adapting elements 912 partially protrude along the third direction Z and the profile of the [man] *main* adapting elements 912 is higher than another surface of the second insulation body 9 orthogonal to the third direction Z. The main adapting elements 912 are [adjacently disposed] *adjacent* to *the* another surface *of the second insulation body 9*. The surface of the second insulation body 9 and *the* another surface *of the second insulation body 9* are [adjacently disposed] *adjacent* and [are] orthogonal to each other. Each of the main adapting elements 912 has a first structure extending along the second direction Y and a second structure extending along the third direction Z. The [profile of the] first structure along the third direction Z is higher than [the profile of] the second insulation body 9, such that the space *of the second insulation body 9* along the third direction Z is [creased] *increased*. [The] *Accordingly, the* thickness of the first structure can be increased along the third direction Z, or the length of the second structure can be increased along the third direction Z, *so that the structural strength of the main adapting elements 912 can be increased through the aforesaid configuration*. The first structure and the second structure [connect with] *are connected to* each other to form a turning structure with an angle [through the aforesaid design to increase the strength of the main adapting elements 912]. The projection of the plane of the main adapting structures 912 between the second direction Y and the third direction Z is L shaped. [When] *Because the main adapting structure 912 is formed by two structures extending along two different directions, when* the main adapting structure 912 is [under pressure] *applied with an external force*, the main adapting structure 912 can spread the external force to two different directions [due to the two structures toward two different directions]. [The] *Therefore the* structure strength of the [man] *main* adapting element 912 [is] *can be* larger than [the] *a* structure [toward] *extending along a* single direction. Furthermore, *through the two structures extending along two different directions,* the main adapting elements 912 can provide better positioning [efficiency through the two structures toward two different directions] *effect*. The adapting elements 91 are disposed adjacently to the paddle board 7, respectively. The length of the main adapting elements 912 is larger than the length of the paddle board 7 along the first direction X. The main adapting element [91] *912* can provide guiding and protection effects to avoid the paddle board 7 from damage.

The elastic element 92 is formed by stamping and bending [of] metal plates. The elastic element 92 includes a main body 921, an engaging portion 924, and a bending portion 925. The bending portion 925 is U shaped and respectively connected to the main body 921 and the engaging portion 924. The main body 921 and the engaging portion 924 are disposed facing each other along the third direction Z. A pair of engaging [element] *elements* 922 [protrudes form] *protrude from* the surface of the main body 921 along the third direction Z. A pressing surface 923 [extend] *extends* from the main body 921. The engaging portion 924 includes a plurality of positioning structures penetrating the through holes of the engaging portion 924. The engaging portion 924 is received in the receiving space 931. The positioning structures are correspondingly secured to the positioning elements of the receiving space 931, such that the elastic element 92 is secured in the second insulation body 9 and is received in the receiving space 931 of the support adapting element 911. The bending portion 925 is engaged in the protruding structure 93 of the support adapting element 911 by mating the profile of the engaging portion 924 and the bending portion 925 of the elastic element 92 with the protruding structure 93. The engaging element 922 of the main body 921 [extend] *extends* along the third direction and is higher than the surface of the protruding structure 93 of the support adapting element 911. When a force is applied on the pressing surface 923 along the third direction Z, the pressing surface 923 and the main body 921 move along the direction of the applied force which bring the associate displacement of the engaging element 922. When the force is removed, the bending portion 925 provide a recovery force that make the pressing surface 923 and the main body 921 go back to the original profiles, such that the variation of the profile of the engaging element 922 can provide the mechanism of lock and unlock.

Figure 7A:
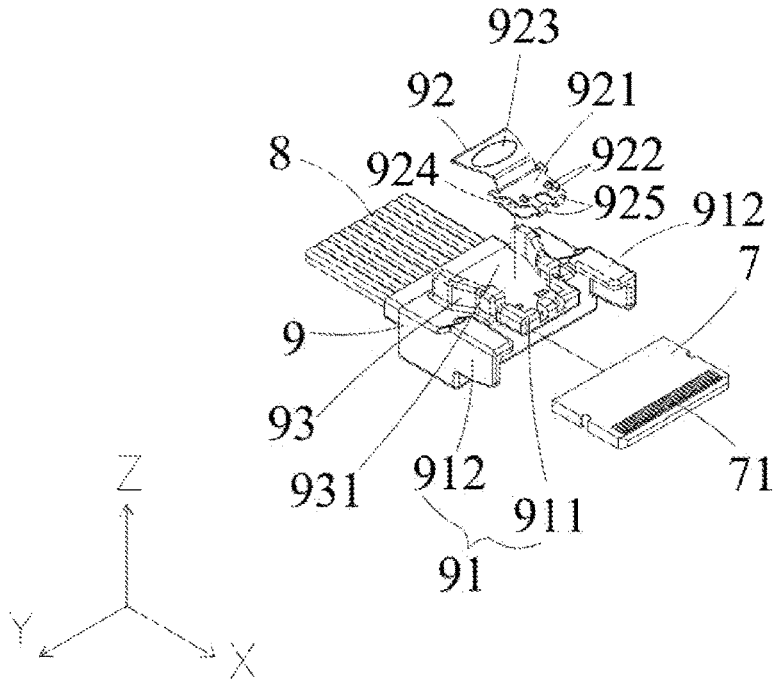
FIG. 7a is an exploded drawing of the plug connector of the seventh embodiment of the present invention.
Figure 8A:
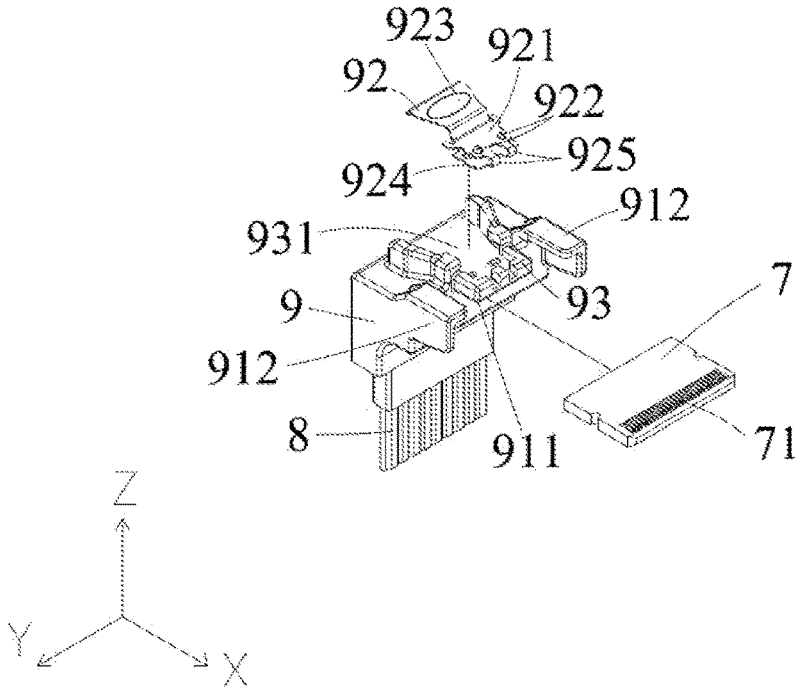
FIG. 8a is an exploded drawing of the plug connector of the tenth embodiment of the present invention.

Referring to FIG. 7a, the plug connector 2 disclosed in the seventh embodiment is a straight plug connector. Referring to FIG. 8a, the plug connector 2 disclosed in the tenth embodiment is a right angle plug connector. In the aforesaid seventh embodiment and the tenth embodiment, two opposite surfaces of the paddle board 7 of the plug connector 2 respectively includes a row of twenty-eight contact points 71 facing each other, and there are totally fifty-six contact points 71 formed on the paddle board 7.

Figure 7B:
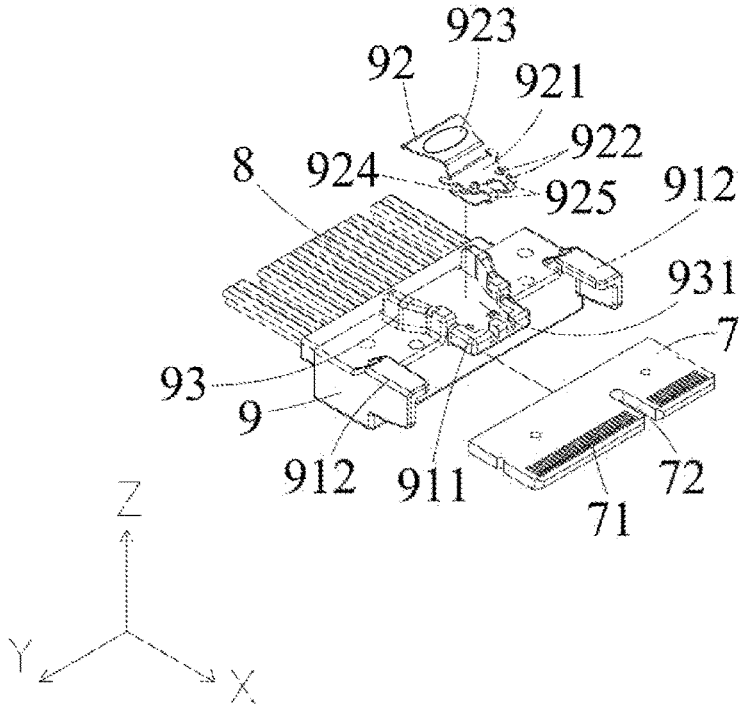
FIG. 7b is an exploded drawing of the plug connector of the eighth embodiment of the present invention.
Figure 8B:
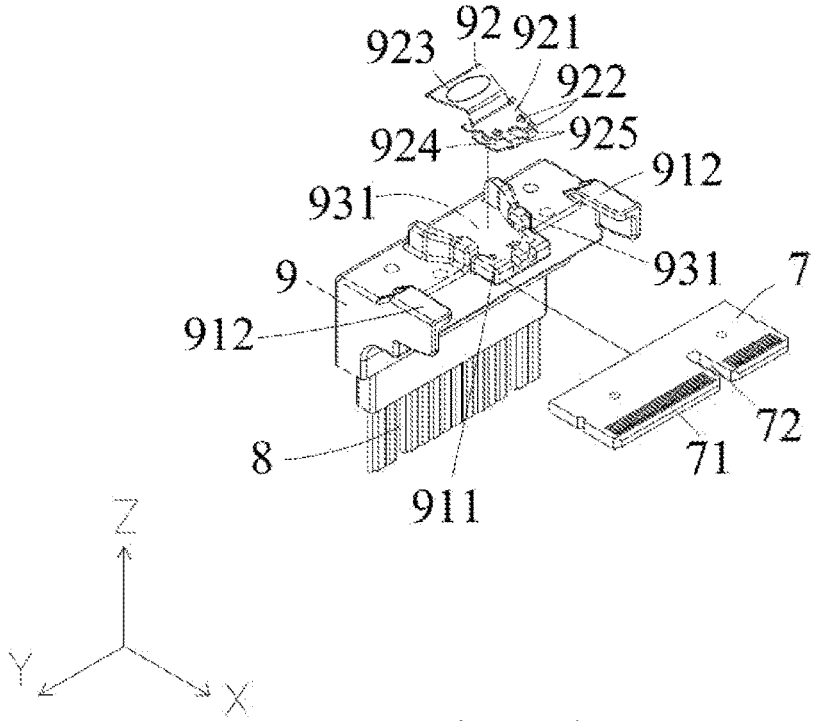
FIG. 8b is an exploded drawing of the plug connector of the eleventh embodiment of the present invention.

Referring to FIG. 7b, the plug connector 2 disclosed in the eighth embodiment is a straight angle plug. The difference between the eighth embodiment and the seventh embodiment is the number of the contact points 71. Referring to FIG. 8b, the plug connector 2 disclosed in the eleventh embodiment is a right angle plug. The difference between the eleventh embodiment and the tenth embodiment is the number of the contact points 71. In the eighth embodiment and the eleventh embodiment, the paddle board 7 totally includes eighty-four contact points 71. The paddle board 7 of the plug connector 2 includes a notch 72 which separate the paddle board 7 as two portions. Two opposite surfaces of a portion of the paddle board 7 respectively has a row of twenty-eight contact points 71 facing each other and two opposite surfaces of another portion has a row of fourteenth contact points 71 facing each other.

Figure 7C:
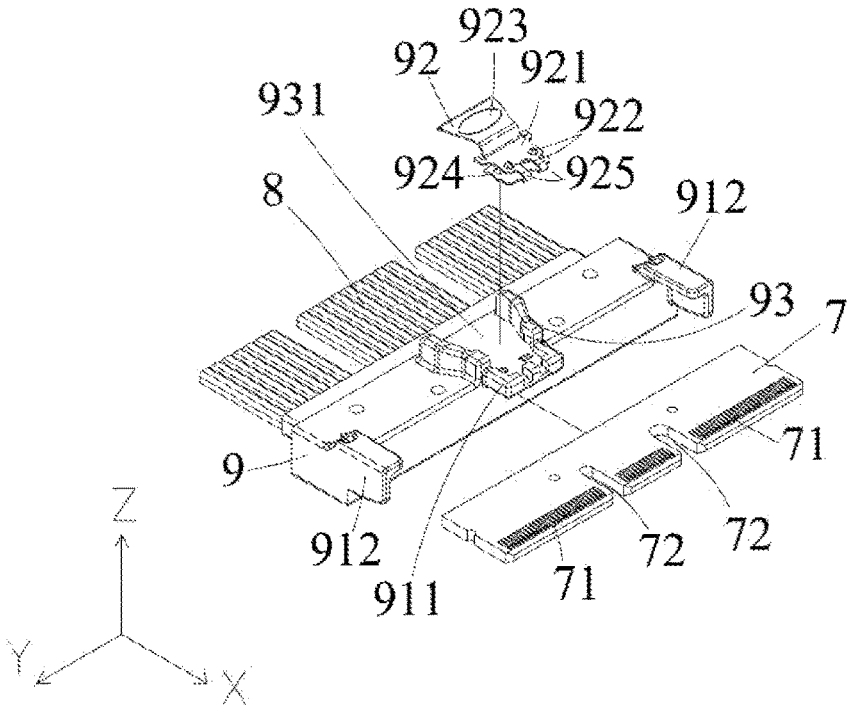
FIG. 7c is an exploded drawing of the plug connector of the ninth embodiment of the present invention.
Figure 8C:
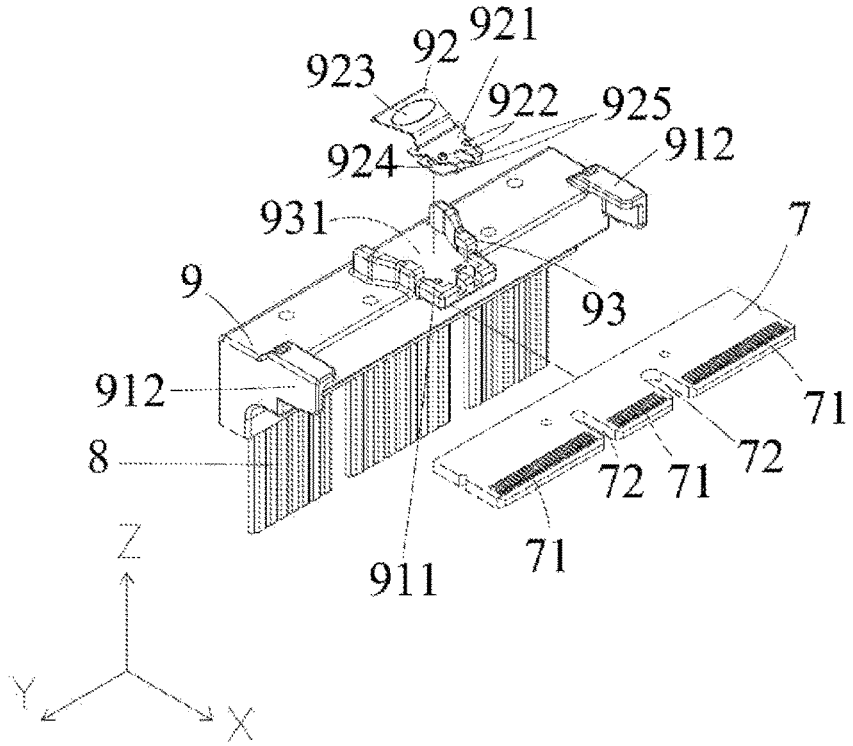
FIG. 8c is an exploded drawing of the plug connector of the twelfth embodiment of the present invention.

Referring to FIG. 7c, the plug connector 2 disclosed in the ninth embodiment is a straight plug connector. The difference between the ninth embodiment and the seventh embodiment is the number of the contact points 71. Referring to FIG. 8c, the plug connector 2 disclosed in the twelfth embodiment is a [right angle] *right-angle* plug. The difference between the twelfth embodiment and the tenth embodiment is the number of the contact points 71. In the ninth embodiment and the twelfth embodiment, the paddle board 7 includes one hundred and forty contact points 71. The paddle board 7 of the plug connector 2 includes two notches 72 which separate the paddle board 7 [to] *into* three portions. Two opposite surfaces of two portions of the paddle board 7 respectively have a row of twenty-eight contact points 71 facing each other and two opposite surfaces of the [rest part has] *remaining portion have* a row of fourteenth contact points 71 facing each other. The arrangement order of the three portions on the paddle board 7 is that a group of fourteenth pairs of *the* contact points 71 is disposed between two groups of twenty-eight pairs of *the* contact points 71.

Referring to the FIG. 9a, FIG. 9b, FIG. 9c, FIG. 10a, FIG. 10b, FIG. 10c, FIG. 11a, FIG. 11b, and FIG. 11c. In the aforesaid embodiments, when the receptacle connector 1 is [prepared] to [mate] *be mated* with the plug connector 2, the pair of the main adapting [element] *elements* 912 of the plug connector 2 contact [with] the first insulation body 4 of the receptacle connector 1 first, and then [search for] *check* the mating position on the main adapting [structure] *structures* 472. The pair of the main adapting [element] *elements* 912 [is a] *are* directional [structure] *structures*, which can provide the ability for the plug connector 2 to check direction when the plug connector 2 [mate] *mates* with the receptacle connector 1. When the plug connector 2 is mated in the inverse direction, the pair of *the* main adapting [structure] *elements* 912 will mate against the surfaces of the receptacle connector 1, *and* the main adapting [element] *elements* 912 and the pair of the main adapting [structure] *structures* 472 cannot be mated properly, such that the plug connector 2 cannot be mated with the receptacle connector 1 along the wrong direction. The pair of the main adapting [element] *elements* 912 and the pair of the main adapting [structure] *structures* 472 provide the fool-proof ability and prevent the wrong operation to avoid damage of the paddle board 7. The pair of the main adapting [element] *elements* 912 [includes] *include* a pair of [the] first [structure] *structures* and a pair of second [structure] *structures*. The pair of the first [structure is] *structures are* disposed correspondingly with the pair of the main adapting [structure] *structures* 472 at the two sides of the first board 41, and the pair of the second [structure is] *structures are* disposed correspondingly with the pair of the main adapting [structure] *structures* 472 of the second board 42 and the fourth board 44. The pair of the main adapting [element] *elements* 912 [is] *are* inserted into the main adapting [structure] *structures* 472, and the main adapting [element] *elements* 912 [is] *are* mated with the main adapting [structure] *structures* 472. The position of the paddle board 7 of the plug connector 2 can be aligned with the mating cavity 45 of the first insulation body 4 through mating the main adapting [element] *elements* 912 and the main adapting [structure] *structures* 472 *with each other*, such that the paddle board 7 can be guided into the receptacle connector 1 through the mating cavity 45, and [avoid] the tilted insertion of the paddle board 7 due to the [unprecise] *imprecise* alignment *can be avoided*, which cause the structure damage to the paddle board 7 or the second insulation body 9. The support adapting element 91 of the second insulation body 9 is mated with the support adapting structure 472 of the first insulation body 4, and the support adapting structure 471 [guided] *guides* the installation of the support adapting element 911. When the paddle board 7 is disposed in the mating cavity 45, the touch portions 511 of the elastic terminals 51 are electrically connected to the [correspondingly] *corresponding* contact points 71 on the paddle board 7, respectively. The shield 3 covers the first insulation body 4 to further confine the support adapting element 911 within the support adapting structure 471 and confine the main adapting [element] *elements* 912 within the main adapting [structure] *structures* 472. The adapting elements 91 are respectively received between the shield 3 and the first insulation body 4 to increase the securing strength of the adapting element 91 in the adapting structure 47 through the confinement of the space of the adapting structure 47 from the shield 3. The elastic element 92 of the support adapting element 911 is guided to the support adapting structure 471, and the engaging element 922 of the elastic element 92 is engaged in the [positioning holes] *securing holes* 37 of the shield 3. Disconnection between the receptacle connector 1 and the plug connector 2 during mating can be avoided and the securing strength can be increased through the configuration of the support adapting element 911 with the pair of *the* main adapting [element] *elements* 912, the support adapting structure 471 with the pair of *the* main adapting [structure] *structures* 472, and the securing between the engaging element 922 of the elastic element 92 and the pair of *the* securing [hole] *holes* 37 of the shield 3.

Figure 9A:
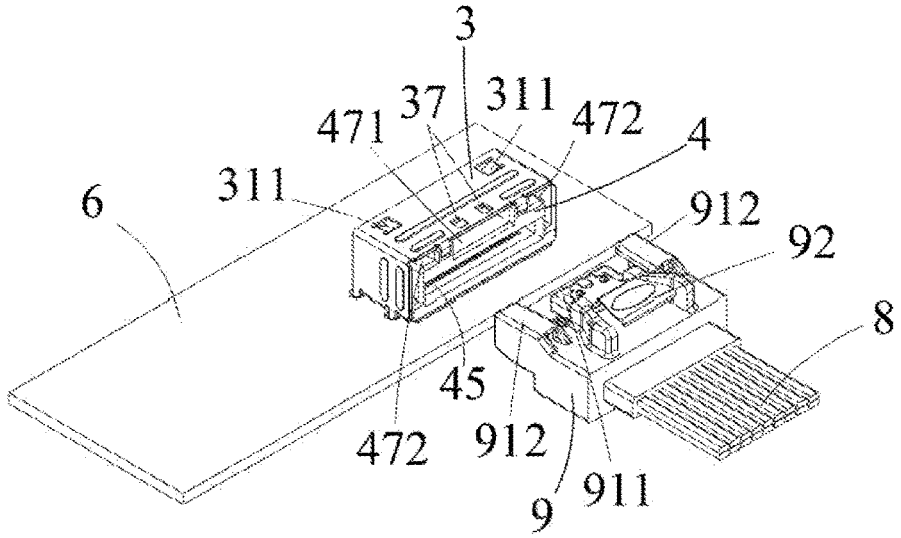
FIG. 9a is a perspective view of a connector assembly according to the thirteenth embodiment of the present invention.
Figure 10A:
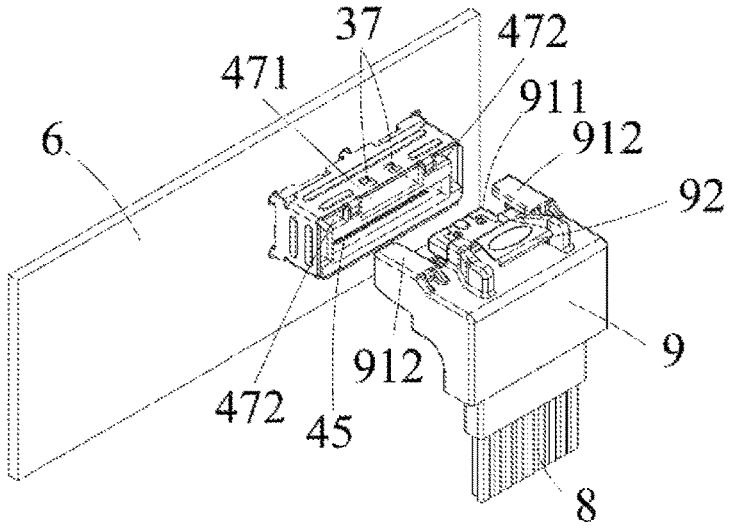
FIG. 10a is a perspective view of a connector assembly according to the sixteenth embodiment of the present invention.
Figure 11A:
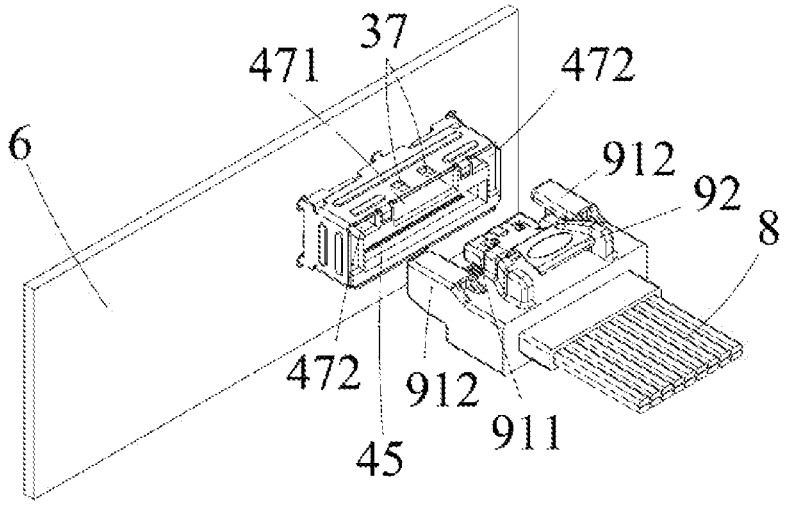
FIG. 11a is a perspective view of a connector assembly according to the nineteenth embodiment of the present invention.

Referring to FIG. 9a, the disclosure of the thirteenth embodiment is the combination of the receptacle connector 1 of the first embodiment and the plug connector 2 of the seventh embodiment. The receptacle connector 1 is a right angle receptacle, and the plug connector 2 is a straight plug connector. Referring to FIG. 10a, the disclosure of the sixteenth embodiment is the combination of the receptacle connector 1 of the fourth embodiment and the plug connector 2 of the tenth embodiment. The receptacle connector 1 is a vertical receptacle connector, and the plug connector 2 is a right angle plug connector. Referring to FIG. 11a, the disclosure of the nineteenth embodiment is the combination of the receptacle connector 1 of the fourth embodiment and the plug connector 2 of the seventh embodiment. The receptacle connector 1 is a vertical receptacle, and the plug connector 2 is a straight plug connector. In the aforesaid thirteenth embodiment, the sixteenth embodiment and the nineteenth embodiment, the receptacle connector 1 includes fifty-six elastic terminals 51 and the paddle board 7 of the plug connector 2 includes fifty-six contact points 71, and the receptacle connector 1 and the plug connector 2 are mated with each other, such that the contact points 71 and the elastic terminals 51 contact each other and are electrically connected.

Figure 9B:
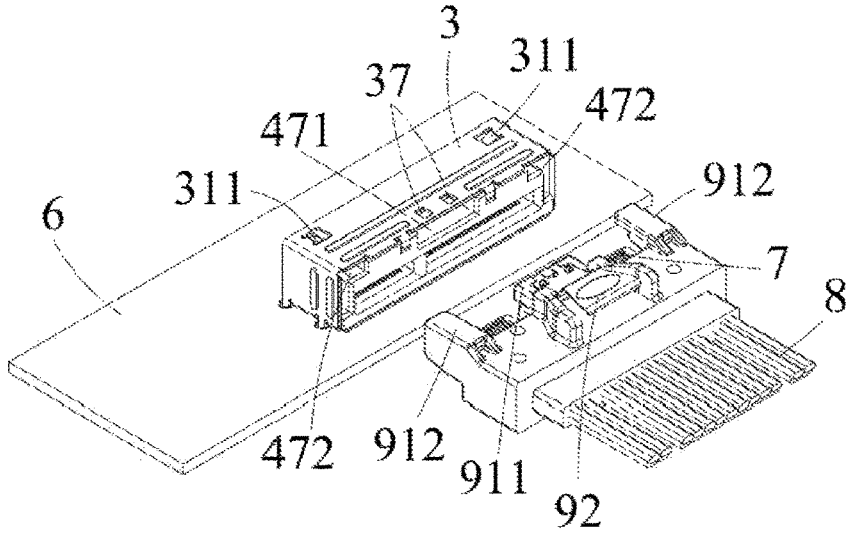
FIG. 9b is a perspective view of a connector assembly according to the fourteenth embodiment of the present invention.
Figure 10B:
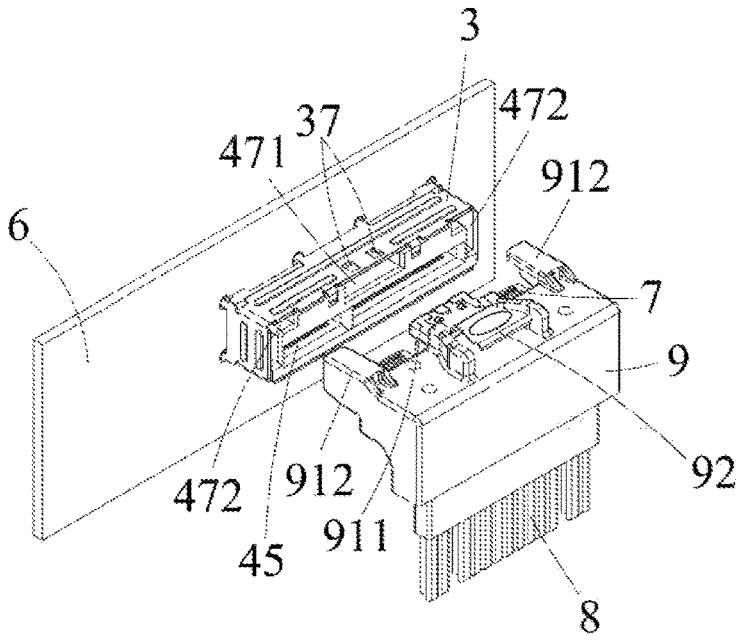
FIG. 10b is a perspective view of a connector assembly according to the seventeenth embodiment of the present invention.
Figure 11B:
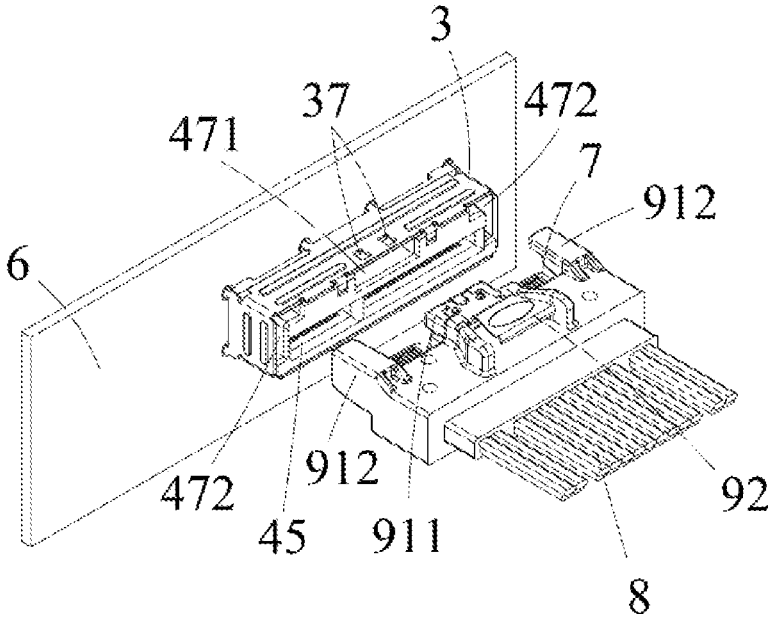
FIG. 11b is a perspective view of a connector assembly according to the twentieth embodiment of the present invention.

Referring to FIG. 9b, the disclosure of the fourteenth embodiment is the combination of the receptacle connector 1 of the second embodiment and the plug connector 2 of the eighth embodiment. The receptacle connector 1 is a [right angle] *right-angle* receptacle, and the plug connector 2 is a straight plug. Referring to FIG. 10b, the disclosure of the seventeenth embodiment is the combination of the receptacle connector 1 of the fifth embodiment and the plug connector 2 of the eleventh embodiment. The receptacle connector 1 is a vertical receptacle, and the plug connector 2 is a [right angle] *right-angle* receptacle connector. Referring to FIG. 11b, the disclosure of the twentieth embodiment is the combination of the receptacle connector 1 of the fifth embodiment and the plug connector 2 of the eighth embodiment. The receptacle connector 1 is a vertical receptacle connector, and the plug connector 2 is a straight plug connector. In the aforesaid fourteenth embodiment, the seventeenth embodiment and the twentieth embodiment, the receptacle connector 1 includes eighty-four elastic terminals 51, twenty-eight pairs of *the* elastic terminals 51 and fourteen pairs of *the* elastic terminals 51 are respectively disposed in the mating cavities 45 at two sides of the dividing element 451 of the first insulation body 4. The paddle board 7 of the plug connector 2 includes eight-four contact points 71, the notch 72 of the paddle board 7 [divided] *divides* the paddle board 7 [as two parts] *into two portions* with twenty-eight pairs of *the* contact points 71 and fourteenth pairs of *the* contact points 71, *respectively*. When the plug connector 2 are assembled and mated with the receptacle connector 1, the dividing element 451 of the first insulation body 4 is mated with the notch 72 of the paddle board 7, [the dividing elements 451 is matched with the notches 72,] such that the twenty-eight pair of *the* elastic terminals 51 and fourteen pairs of elastic terminals 51 of the receptacle connector 1 are respectively mated with the twenty-eight pairs of *the* contact points 71 and fourteen pairs of *the* contact points 71 sequentially.

Figure 9C:
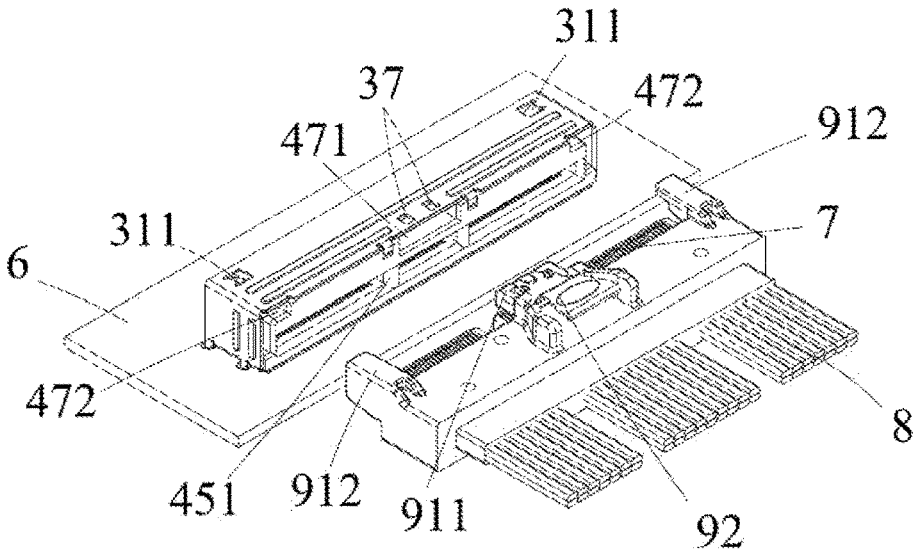
FIG. 9c is a perspective view of a connector assembly according to the fifteenth embodiment of the present invention.
Figure 10C:
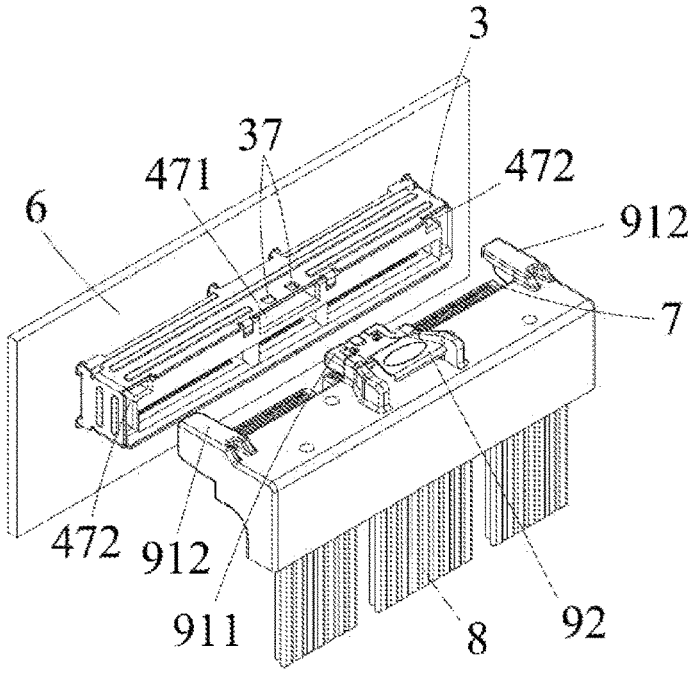
FIG. 10c is a perspective view of a connector assembly according to the eighteenth embodiment of the present invention.
Figure 11C:
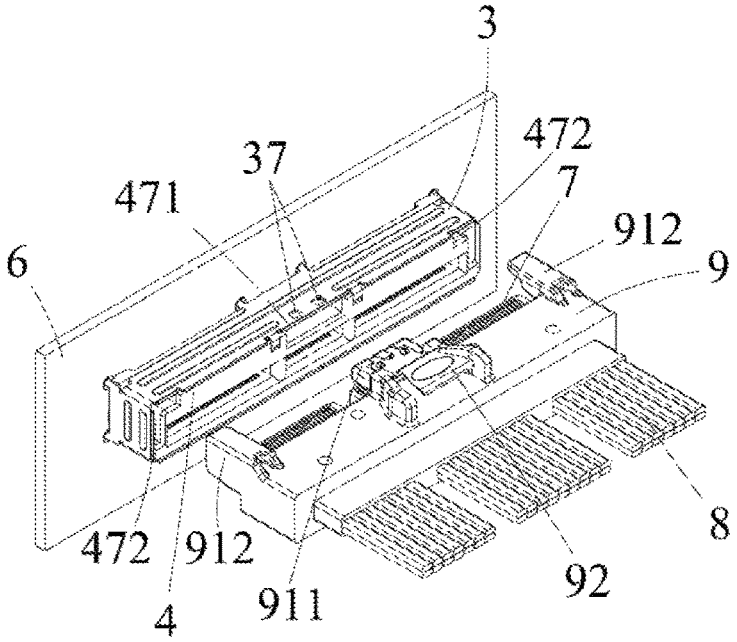
FIG. 11c is a perspective view of a connector assembly according to the twenty-first embodiment of the present invention.
Figure 12:
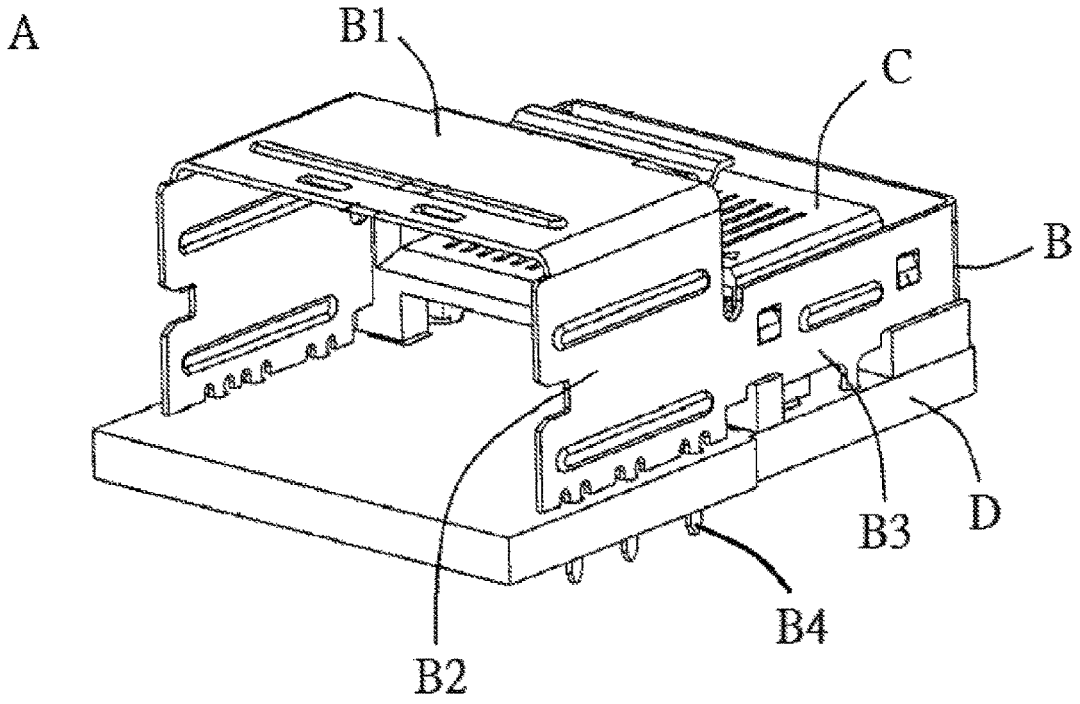
Fig. 12 ( PRIOR ART )
FIG. 12 is a figure of the prior art from U.S. Pat. No. 7,445,504.

Referring to FIG. 9c, the disclosure of the fifteenth embodiment is the combination of the receptacle connector 1 of the third embodiment and the plug connector 2 of the ninth embodiment. The receptacle connector 1 is a [right angle] *right-angle* receptacle connector, and the plug connector 2 is a straight plug connector. Referring to FIG. 10c, the disclosure of the eighteenth embodiment is the combination of the receptacle connector 1 of the sixth embodiment and the receptacle connector 2 of the twelfth embodiment. The receptacle connector 1 is a vertical receptacle connector, and the plug connector 2 is a [right angle] *right-angle* plug connector. Referring to FIG. 11c, the disclosure of the twenty-first embodiment is the combination of the receptacle connector 1 of the sixth embodiment and the plug connector 2 of the ninth embodiment. The receptacle connector 1 is a vertical receptacle connector, and the plug connector 2 is a straight plug connector. In the aforesaid fifteenth embodiment, the eighteenth embodiment and the twenty-first embodiment, the receptacle connector 1 includes one hundred and forty elastic terminals 54, *and* two groups of twenty-eight pairs of *the* elastic terminals 51 and a group of fourteen pairs of *the* elastic terminals 51 are respectively disposed in the three mating cavities 45 formed by two dividing elements 451 of the first insulation body 4. The paddle board 7 of the plug connector 2 includes one hundred and forty contact points 71, *and* the two notches 72 of the paddle board 7 [divided] *divide* the paddle board 7 [as three parts] *into three portions* with two groups of twenty-eight pairs of *the* contact points 71 and one group of fourteenth pairs of *the* contact points 71 , *respectively*. When the plug connector 2 [are] *is* assembled and mated with the receptacle connector 1, the dividing elements 451 of the first insulation body 4 [is] *are* mated with the notches 72 of the paddle board 7[, the dividing elements 451 is matched with the notches 72], such that the two groups of the twenty-eight pair of *the* elastic terminals 51 and the one group of the fourteen pairs of *the* elastic terminals 51 of the receptacle connector 1 are respectively mated with the two groups of the twenty-eight pairs of *the* contact points 71 and the one group of the fourteen pairs of *the* contact points 71 [in sequential order] *sequentially*.

To adjust to different environment and data transformation, the plug connectors 2 or the receptacle connectors 1 are designed with different configurations. The receptacle connector 1 includes different amount of elastic terminals 51 and different types of vertical receptacle connector and right angle receptacle connector. The plug connector 2 includes different amount of contact points 71, straight plug and vertical plug. When the amount of the contact points 71 of the plug connector 2 and the elastic terminals 51 of the receptacle connector 1 are the same, different configuration of the structures can adjust to different space, such that the receptacle connector 1 and the plug connector 2 can be mated in limited space.

[Comparing] *Compared* to the prior art, the metal shield and the insulated body of a normal SAS standard plug connector are merely partially connected, and a gap [is] *exists* between the metal shield and the insulated body which [occupied] *occupies* larger volume and produced space waste . The connection design between the metal shield and the insulated body is at the risk of [disconnecting] *disconnection*, and there may be unprecise positioning and disconnection problems when the receptacle connector 1 and the plug connector 2 are mated *with each other*. A series of improvement have been applied [on] *to* the receptacle connector 1 and the plug connector 2 of the present invention to overcome the deficiencies of prior [arts] *art*. The receptacle connector 1 includes a shield 3, a first insulation body 4, a terminal group 5, and a circuit board 6. The terminal group 5 is disposed in the terminal slot 46 of the first insulation body 4, and the shield 3 surrounds the first insulation body 4 and is secured in the positioning hole 412 of the first insulation body 4 through the [bard] *barb* 38 to strengthen the connection strength between the shield 3 and the first insulation body 4 and the shield 3 which surrounds the first insulation body 4 can provide better electromagnetic shielding effect and consume less space. Many adapting elements 91 [surrounded] *surround* the paddle board 7 of the plug connector 2 to protect paddle board 7. When the plug connector 2 is mated with the receptacle connector 1, the structure configured with an angle of the adapting element 91 can provide a more precise directional guiding, and further assemble with the corresponding adapting structure 47 of the receptacle connector 1. The adapting element 91 will be mated with the adapting structure 47 first due to the lengths of the adapting elements 91 are larger than the length of the circuit board along the mating direction, and then the adapting element 91 will further locate the positions of the paddle board 7 and the mating cavity 45 of the first insulation body 4. It is convenient to dispose the paddle board 7 in the mating cavity 45 of the first insulation body to eliminate crash and rubbing between paddle board 7 and the first insulation body 4 and to improve the [life time] *service life* of the paddle board 7. The adapting elements 91 are mated with the corresponding adapting structures 47 and are received between the first insulation body 4 and the shield 3. The shield 3 limits the space of the adapting structure 47 to increase the securing strength of the adapting elements 91 in the adapting structures 47 and to reduce the disconnection problem between the receptacle connectors and the plug connectors.

The foregoing has outlined features of several embodiments. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

[1. A connector assembly, comprising:

a receptacle connector, comprising:

a shield having a receiving slot, wherein the shield is formed by metal plates; and a first insulation body disposed in the receiving slot, wherein the first insulation body is made of insulation plastic material, and the first insulation body comprises:

at least one mating cavity, wherein the first insulation body and the shield collectively define a plurality of main adapting structures forming an opening on a first surface of the first insulation body; and at least one terminal group having a plurality of terminals arranged as at least one row along a first direction, wherein the terminal group is disposed in the mating cavity of the first insulation body; and a plug connector mated with the receptacle connector, the plug connector comprising:

a paddle board electrically connected to a cable; and a second insulation body secured with the paddle board and the cable, wherein the second insulation body is made of an insulation plastic material and comprises a plurality of main adapting elements extending from a first surface of the second insulation body and are adjacently disposed to the paddle board, the main adapting structures guide the main adapting elements, and the main adapting structures and the main adapting elements are mated collectively.]

[2. The connector assembly of claim 1, wherein the second insulation body comprises a second surface adjacent to the main adapting elements, and the main adapting elements partially protrude from the second surface.]

[3. The connector assembly of claim 1, wherein the main adapting elements prevent the plug connector and the receptacle connector from connecting along the wrong direction.]

[4. The connector assembly of claim 1, wherein the main adapting elements and the paddle board protrude from the same surface of the second insulation body along a second direction, and a length of the main adapting elements in the second direction is longer than a length of the paddle board in the second direction.]

[5. The connector assembly of claim 1, wherein the plug connector further comprises a support adapting element extending from the first surface of the second insulation body, the support adapting element is disposed between the main adapting elements, and the receptacle connector has a support adapting structure corresponding to the support adapting element.]

6. [The] *A* connector assembly [of claim 5], *comprising:*

*a first connector, comprising:*

*a shield having a receiving slot; and*

*a first insulation body disposed in the receiving slot, wherein the first insulation body comprises:*

*at least one mating cavity, wherein the first insulation body and the shield collectively define a plurality of main adapting structures, each of the main adapting structures forms an enclosed opening on a first surface of the first insulation body; and*

*at least one first terminal group having a plurality of terminals arranged as at least one row along a first direction, wherein each of the at least one first terminal group is disposed in a corresponding one of the at least one mating cavity of the first insulation body; and a second connector mated with the first connector, the second connector comprising:*

*at least one second terminal group; and*

*a second insulation body secured with the at least one second terminal group, wherein the second insulation body comprises a plurality of main adapting elements extending from a first surface of the second insulation body and adjacently disposed to the at least one second terminal group, the main adapting structures guide the main adapting elements, and the main adapting structures and the main adapting elements are mated collectively;*

*wherein the second connector further comprises a support adapting element extending from the first surface of the second insulation body, the support adapting element is disposed between the main adapting elements, the first connector comprises a support adapting structure collectively defined by the first insulation body and the shield, and the support adapting structure forms another enclosed opening corresponding to the support adapting element,* wherein the [plug] *second* connector further comprises an elastic element secured to the support adapting element, the elastic element includes a plurality of engaging elements, and the engaging elements protrude from a surface of the elastic element*; the shield has a plurality of securing holes corresponding to the engaging elements of the elastic element; the support adapting element comprises a protruding structure extending from an end of the support adapting element, a region surrounded by the protruding structure defines a receiving space, and the elastic element is disposed in the receiving space; the second insulation body comprises a second surface adjacent to the main adapting elements, and the main adapting elements partially protrude from the second surface of the second insulation body; the main adapting elements between the first surface of the second insulation body and the second surface of the second insulation body are L-shaped.*

[7. The connector assembly of claim 6, wherein the shield has a plurality of securing holes corresponding to the engaging elements of the elastic element.]

[8. The connector assembly of claim 6, wherein the support adapting element comprises a protruding structure extending from an end of the support adapting element, a region surrounded by the protruding structure defines a receiving space, and the elastic element is disposed in the receiving space.]

[9. The connector assembly of claim 1, wherein the first insulation body of the receptacle connector further comprises at least one dividing element, the number of the mating cavities is plural, the dividing element and the first insulation body form the mating cavities; and the paddle board of the plug connector comprises at least one notch, the notch separates the paddle board into a plurality of parts, and the dividing element and the notch is mated collectively.]

10. The connector assembly of claim [1]*6*, wherein when the [plug] *second* connector mates with the [receptacle] *first* connector, the main adapting elements are received between the shield and the first insulation body.

11. The connector assembly of claim [1]*6*, wherein the shield comprises at least one barb extending from an edge of the shield, and the *at least one* barb bends and extends into the receiving slot of the shield*; the first insulation body comprises at least one positioning hole located on the first surface of the first insulation body adjacent to the shield, and each of the at least one barb of the shield is secured in a corresponding one of the at least one positioning hole of the first insulation body*.

[12. The connector assembly of claim 11, wherein the first insulation body comprises at least one positioning hole located on a first surface of the first insulation body adjacent to the shield, and the barb of the shield is secured in the positioning hole of the first insulation body.]

13. The connector assembly of claim [5] *6*, wherein the shield covers the first insulation body such that the support adapting element is confined within the support adapting structure and the main adapting elements are confined within the main adapting structures.

[14. The connector assembly of claim 5, wherein the support adapting element and the paddle board are adjacently disposed and are in parallel to each other.]

[15. The connector assembly of claim 2, wherein the main adapting elements between the first surface and the second surface of the second insulation body are L shaped.]

16. The connector assembly of claim [1] *6*, wherein the shield covers the first insulation body so as to increase [the] *an* ability of electromagnetic shielding of the first insulation body.

[17. A connector assembly, comprising:

a receptacle connector, comprising:

a shield having a receiving slot, wherein the shield is formed by metal plates; and a first insulation body disposed in the receiving slot, wherein the first insulation body is made of insulation plastic material, and the first insulation body comprises:

at least one mating cavity, wherein the first insulation body and the shield collectively define at least one adapting structure; and at least one dividing element, wherein the number of the mating cavities is plural, and the dividing element and the first insulation body form the mating cavities; and at least one terminal group having a plurality of terminals arranged as at least one row along a first direction, wherein the terminal group is disposed in the mating cavity of the first insulation body; and a plug connector mated with the receptacle connector, the plug connector comprising:

a paddle board electrically connected to a cable, wherein the paddle board comprises at least one notch, the notch separates the paddle board into a plurality of parts, and the dividing element and the notch is mated collectively; and a second insulation body secured with the paddle board and the cable, wherein the second insulation body is made of an insulation plastic material and comprises at least one adapting element, the adapting element extends from the second insulation body and is adjacently disposed to the paddle board, and the adapting element and the adapting structure are mated to each other.]

[18. The connector assembly of claim 17, wherein when the plug connector mates with the receptacle connector, the adapting element is received between the shield and the first insulation body.]

[19. The connector assembly of claim 17, wherein the adapting element and the paddle board protrude from the same surface of the second insulation body along a second direction, and a length of the adapting element in the second direction is longer than a length of the paddle board in the second direction.]

*20. The connector assembly of claim 6, wherein at least one portion of the main adapting structures overlaps with the terminals of the at least one first terminal group from a top view of the plurality of terminals.*

*21. The connector assembly of claim 20, wherein the main adapting structures are spaced apart from the terminals of the at least one first terminal group along a direction perpendicular to a length direction of the at least one first terminal group.*

*22. The connector assembly of claim 6, wherein the main adapting elements are spaced apart from terminals of the at least one second terminal group along a direction perpendicular to a length direction of the at least one second terminal group.*

* * * * *